United States Patent
Kyo et al.

(10) Patent No.: US 10,434,821 B2
(45) Date of Patent: Oct. 8, 2019

(54) MODIFIED CONJUGATED DIENE-BASED POLYMER AND PRODUCTION METHOD THEREFOR, RUBBER COMPOSITION AND TIRE

(71) Applicant: Asahi Kasei Kabushiki Kaisha, Tokyo (JP)

(72) Inventors: Miki Kyo, Tokyo (JP); Shinichi Sekikawa, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/580,927

(22) PCT Filed: Jun. 7, 2016

(86) PCT No.: PCT/JP2016/066963
§ 371 (c)(1),
(2) Date: Dec. 8, 2017

(87) PCT Pub. No.: WO2016/199779
PCT Pub. Date: Dec. 15, 2016

(65) Prior Publication Data
US 2018/0162167 A1 Jun. 14, 2018

(30) Foreign Application Priority Data
Jun. 12, 2015 (JP) ................................ 2015-119504

(51) Int. Cl.
| B60C 1/00 | (2006.01) |
|---|---|
| C08C 19/22 | (2006.01) |
| C08C 19/25 | (2006.01) |
| C08F 36/06 | (2006.01) |
| C08C 19/44 | (2006.01) |
| C08F 236/10 | (2006.01) |
| C08L 9/00 | (2006.01) |
| C08F 4/48 | (2006.01) |

(52) U.S. Cl.
CPC .............. B60C 1/0016 (2013.01); B60C 1/00 (2013.01); B60C 1/0041 (2013.01); C08C 19/22 (2013.01); C08C 19/25 (2013.01); C08C 19/44 (2013.01); C08F 36/06 (2013.01); C08F 236/10 (2013.01); C08L 9/00 (2013.01); C08F 2500/04 (2013.01); C08F 2500/05 (2013.01); C08F 2500/17 (2013.01)

(58) Field of Classification Search
CPC ..... C08C 19/22; C08C 19/1925; C08F 36/06; C08F 2500/21
USPC ........................................................ 525/105
See application file for complete search history.

(56) References Cited

U.S. PATENT DOCUMENTS

| 2003/0199669 A1 | 10/2003 | Saito et al. |
|---|---|---|
| 2006/0173138 A1 | 8/2006 | Hogan et al. |
| 2013/0023624 A1 | 1/2013 | Sekikawa et al. |
| 2014/0114014 A1* | 4/2014 | Tokimune ................ C08K 3/36 |
| | | 524/547 |
| 2014/0371383 A1 | 12/2014 | Hayata et al. |
| 2015/0045474 A1 | 2/2015 | Lee et al. |
| 2016/0208023 A1 | 7/2016 | Lee et al. |

FOREIGN PATENT DOCUMENTS

| CN | 104507974 A | 4/2015 |
|---|---|---|
| EP | 1153972 A1 | 11/2001 |
| EP | 1865023 A1 | 12/2007 |
| EP | 1942120 A1 | 7/2008 |
| EP | 2003146 A2 | 12/2008 |
| EP | 2045272 A1 | 4/2009 |
| EP | 2338919 A1 | 6/2011 |
| JP | H11-189616 A | 7/1999 |
| JP | 2003-171418 A | 6/2003 |
| JP | 2005-290355 A | 10/2005 |
| JP | 2005-298626 A | 10/2005 |
| JP | 2008-527150 A | 7/2008 |
| JP | 2013-082840 A | 5/2013 |
| JP | 2013-245247 A | 12/2013 |
| JP | 2013-245248 A | 12/2013 |
| JP | 2015-131955 A | 7/2015 |
| JP | 2016-079217 A | 5/2016 |
| KR | 2015-0044825 A | 4/2015 |
| WO | 2001/023467 A | 4/2001 |
| WO | 2007/114203 A1 | 10/2007 |
| WO | 2011/129425 A1 | 10/2011 |
| WO | 2013/031599 A1 | 3/2013 |

OTHER PUBLICATIONS

International Search Report issued in corresponding International Patent Application No. PCT/JP2016/066963 dated Sep. 6, 2016.
Supplementary European Search Report issued in corresponding European Patent Application No. 16807486.2 dated Jun. 5, 2018.
International Preliminary Report on Patentability and Written Opinion issued in corresponding International Patent Application No. PCT/JP2016/066963 dated Dec. 12, 2017.

* cited by examiner

Primary Examiner — Fred M Teskin
(74) Attorney, Agent, or Firm — Morgan, Lewis & Bockius LLP

(57) ABSTRACT

In a modified conjugated diene-based polymer, a ratio of a coupling polymer, obtained by gel permeation chromatography (GPC), is 70% by mass or more based on a total amount of the modified conjugated diene-based polymer, and a modification ratio obtained by adsorption GPC is 70% by mass or more based on a total amount of the modified conjugated diene-based polymer, and when Mooney viscosity $ML_{1+4}$ (100° C.) measured at 100° C. is represented by ML and a weight average molecular weight obtained by GPC is represented by Mw, $ML \leq 1.8 (Mw \times 10^{-4}) - 31.5$, and Mooney viscosity $ML_{1+4}$ (100° C.) measured at 100° C. is 30 to 150.

14 Claims, 2 Drawing Sheets

[Figure 1]
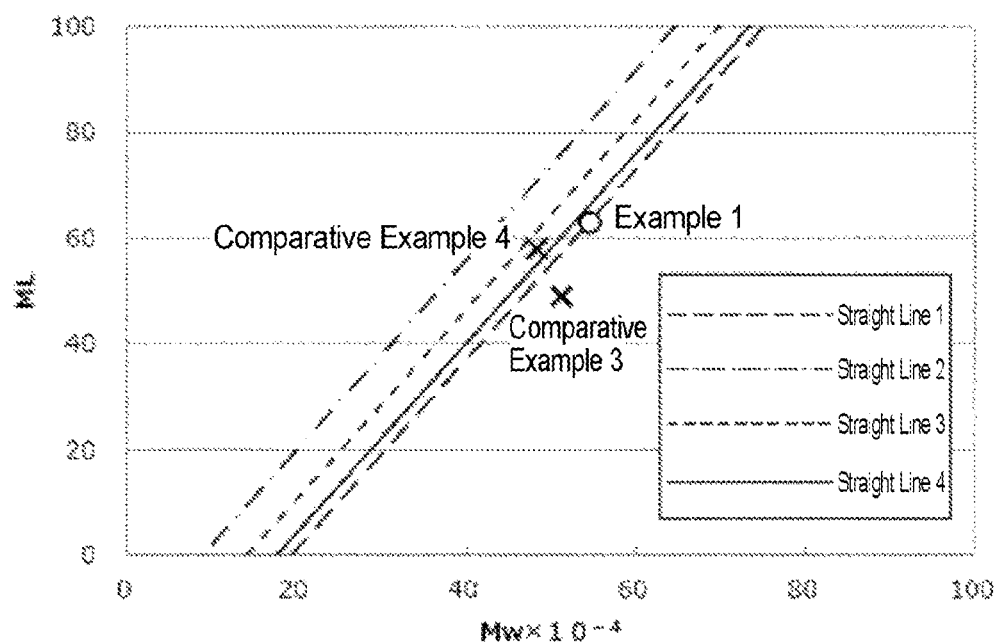
[Figure 2]
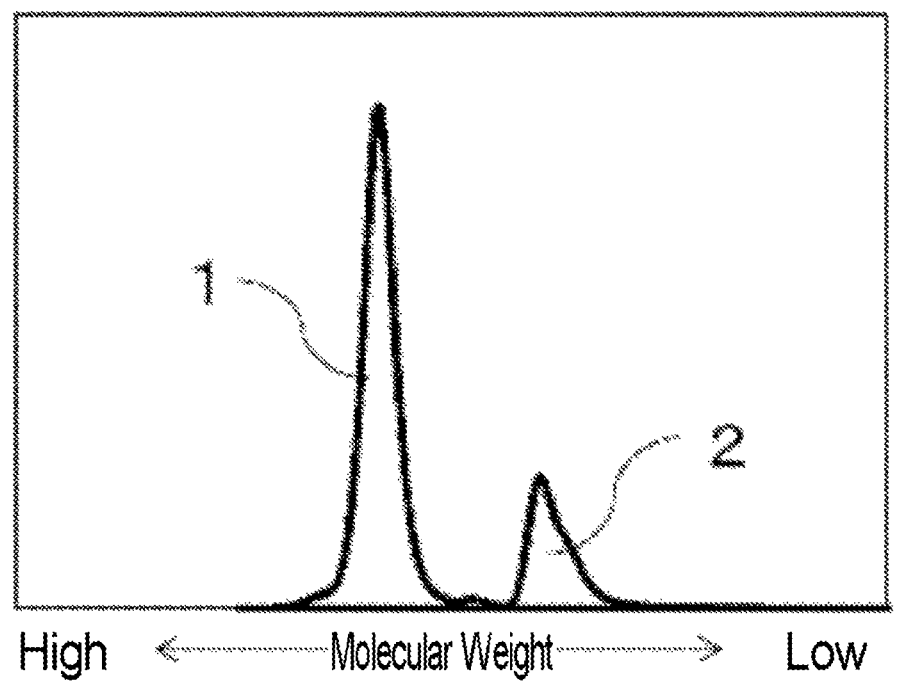

[Figure 3]
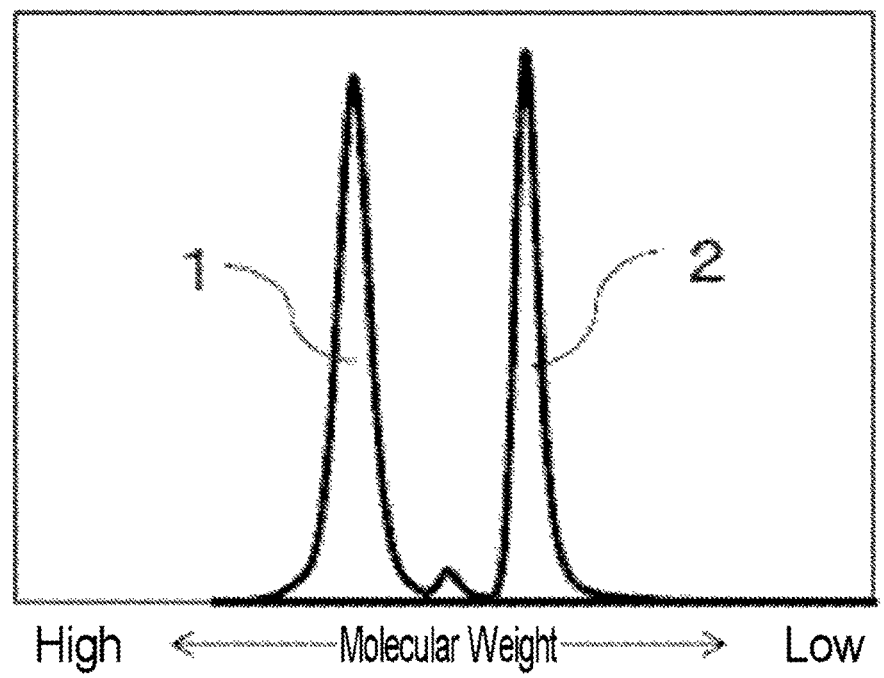
[Figure 4]
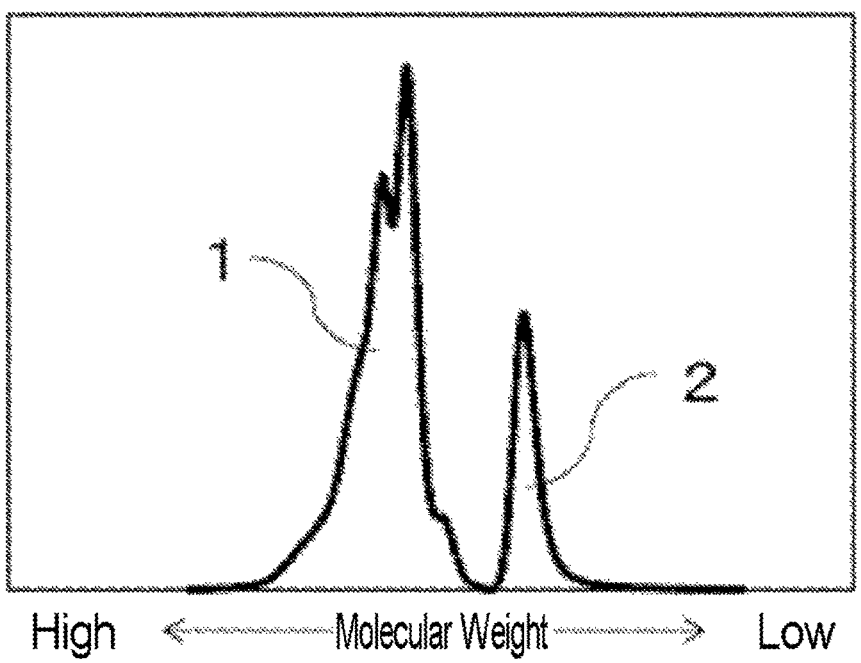

MODIFIED CONJUGATED DIENE-BASED POLYMER AND PRODUCTION METHOD THEREFOR, RUBBER COMPOSITION AND TIRE

TECHNICAL FIELD

The present invention relates to a modified conjugated diene-based polymer and a production method therefor, a rubber composition and a tire.

BACKGROUND ART

There have been increasing demands for reduction of fuel consumption in vehicles, and improvement of materials of a vehicle tire, particularly, of a tire tread in contact with the ground is required.

Recently, development of a material having low rolling resistance, namely, a material having a low hysteresis loss property, has been demanded.

Besides, in order to reduce the weight of a tire, it is necessary to reduce the thickness of a tread portion of the tire, and there is a demand for a material having high abrasion resistance.

On the other hand, a material used for a tire tread is required, from the viewpoint of safety, to be excellent in wet skid resistance.

An example of a material meeting the aforementioned requirements includes a material containing a rubber and a reinforcing filler such as carbon black or silica. If, for example, a material containing silica is used, balance between the low hysteresis loss property and the wet skid resistance can be improved. Besides, an attempt has been made to reduce a hysteresis loss by improving dispersibility of silica in a material through introduction of a functional group having affinity or reactivity with silica into a molecular end of a rubber having high mobility, and further by reducing the mobility of the molecular end of the rubber through a bond with a silica particle.

For example, Patent Literature 1 proposes a modified diene-based rubber obtained by reacting a modifier having a glycidylamino group with a polymer active end.

Besides, Patent Literatures 2 to 4 propose a modified diene-based rubber obtained by reacting an alkoxysilane having an amino group with a polymer active end, and a composition of such a modified diene-based rubber and silica.

Furthermore, Patent Literatures 5 and 6 propose a polymer functionalized through a reaction of a cyclic aza-sila cycle compound with a polymer active end.

Furthermore, Patent Literature 7 proposes a diene-based rubber obtained through a coupling reaction between a polymer active end and a multi-functional silane compound.

CITATION LIST

Patent Literature

[Patent Literature 1] International Publication No. WO 01/23467
[Patent Literature 2] Japanese Patent Laid-Open No. 2005-290355
[Patent Literature 3] Japanese Patent Laid-Open No. 11-189616
[Patent Literature 4] Japanese Patent Laid-Open No. 2003-171418
[Patent Literature 5] National Publication of International Patent Application No. 2008-527150
[Patent Literature 6] International Publication No. WO 11/129425
[Patent Literature 7] International Publication No. WO 07/114203

SUMMARY OF INVENTION

Technical Problem

A material containing silica has, however, a disadvantage of being inferior in dispersibility to carbon black because it has a hydrophilic surface and hence has low affinity with a conjugated diene-based rubber while carbon black has a hydrophobic surface. Therefore, the material containing silica needs to additionally contain a silane coupling agent or the like to improve the dispersibility by imparting a bond between the silica and the rubber.

Besides, the material in which a functional group having high reactivity with silica is introduced into a molecular end of the rubber has a problem that processability tends to be degraded, for example, it becomes difficult to knead because a reaction with a silica particle proceeds during a kneading process to increase the viscosity of a resultant composition, or surface coarseness or sheet breakage is easily caused when formed into a sheet after the kneading. In addition, when such a material is used to obtain a vulcanizate, in particular, used to obtain a vulcanizate containing an inorganic filler such as silica, it has a problem that the balance between the low hysteresis loss property and the wet skid resistance, and the abrasion resistance are not sufficient.

Therefore, an object of the present invention is to provide a modified conjugated diene-based polymer that is excellent in processability obtained when used for obtaining a vulcanizate, and when in the form of a vulcanizate, excellent in balance between a low hysteresis loss property and wet skid resistance and in abrasion resistance.

Solution to Problem

The present inventors made earnest studies to solve the above-described problems of the related arts, and as a result, it was found that a modified conjugated diene-based polymer comprising a coupling polymer in a prescribed ratio, having a modification ratio of a prescribed or larger value, and having a prescribed relationship between its Mooney viscosity and its weight average molecular weight can overcome the aforementioned problems of the related arts, and thus, the present invention was accomplished.

Specifically, the present invention provides the following:

[1]

A modified conjugated diene-based polymer,
wherein a ratio of a coupling polymer, obtained by gel permeation chromatography (GPC), is 70% by mass or more based on a total amount of the modified conjugated diene-based polymer, and a modification ratio obtained by adsorption GPC is 70% by mass or more based on a total amount of the modified conjugated diene-based polymer,
when Mooney viscosity $ML_{1+4}$ (100° C.) measured at 100° C. is represented by ML and a weight average molecular weight obtained by GPC is represented by Mw, $ML \leq 1.8$ $(Mw \times 10^{-4})-31.5$, and Mooney viscosity $ML_{1+4}$ (100° C.) measured at 100° C. is 30 to 150.

[2]

The modified conjugated diene-based polymer according to [1], wherein the modified conjugated polymer has a nitrogen atom and/or a silicon atom.

[3]

The modified conjugated diene-based polymer according to [1] or [2], wherein the modified conjugated polymer has a silicon atom, and at least one of the silicon atom constitute an alkoxysilyl group having 1 to 20 carbon atoms or a silanol group.

[4]

The modified conjugated diene-based polymer according to any one of [1] to [3], wherein when a peak top molecular weight, obtained by GPC, of a coupling polymer of the modified conjugated diene-based polymer is represented by $Mp_1$ and a peak top molecular weight of a non-coupling polymer of a conjugated diene-based polymer chain constituting the modified conjugated diene-based polymer is represented by $Mp_2$ r $(Mp_1/Mp_2) \geq 3.4$.

[5]

The modified conjugated diene-based polymer according to any one of [1] to [4], having a branch structure including six or more branches.

[6]

The modified conjugated diene-based polymer according to any one of [1] to [5], wherein $ML \leq 1.8 \, (Mw \times 10^{-4}) - 44.2$.

[7]

The modified conjugated diene-based polymer according to any one of [1] to [6], wherein when a peak top molecular weight, obtained by GPC, of a coupling polymer of the modified conjugated diene-based polymer is represented by $Mp_1$ and a peak top molecular weight of a non-coupling polymer of a conjugated diene-based polymer chain constituting the modified conjugated diene-based polymer is represented by $Mp_2$, $(Mp_1/Mp_2) \geq 3.8$.

[8]

The modified conjugated diene-based polymer according to any one of [1] to [7], wherein the modified conjugated diene-based polymer is represented by the following general formula (I):

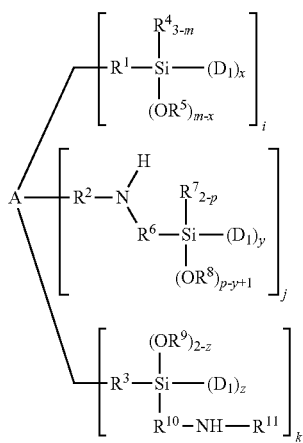

wherein $D_1$ represents a conjugated diene-based polymer chain, $R^1$ to $R^3$ each independently represent a single bond or an alkylene group having 1 to 20 carbon atoms, $R^4$ and $R^7$ each independently represent an alkyl group having 1 to 20 carbon atoms, $R^5$, $R^8$ and $R^9$ each independently represent a hydrogen atom or an alkyl group having 1 to 20 carbon atoms, $R^6$ and $R^{10}$ each independently represent an alkylene group having 1 to 20 carbon atoms, $R^{11}$ represents a hydrogen atom or an alkyl group having 1 to 20 carbon atoms, m and x each represent an integer of 1 to 3, $x \leq m$, p represents 1 or 2, y represents an integer of 1 to 3, $y \leq (p+1)$, z represents an integer of 1 or 2, each of $D_1$, $R^1$ to $R^{11}$, m, p, x, y and z, if present in a plural number, is respectively independent and may be the same as or different from each other, i represents an integer of 0 to 6, j represents an integer of 0 to 6, k represents an integer of 0 to 6, (i+j+k) is an integer of 3 to 10, $((x \times i)+(y \times j)+(z \times k))$ is an integer of 6 to 30, and A represents a hydrocarbon group having 1 to 20 carbon atoms, or an organic group having at least one atom selected from the group consisting of an oxygen atom, a nitrogen atom, a silicon atom, a sulfur atom and a phosphorous atom, and not having active hydrogen.

[9]

The modified conjugated diene-based polymer according to [8], wherein A in the formula (I) represents any one of following formulas (II) to (V):

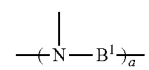 

(II)

wherein $B^1$ represents a single bond or a hydrocarbon group having 1 to 20 carbon atoms, a represents an integer of 1 to 10, and $B^1$, if present in a plural number, is respectively independent, and may be the same as or different from each other;

(III)

wherein $B^2$ represents a single bond or a hydrocarbon group having 1 to 20 carbon atoms, $B^3$ represents an alkyl group having 1 to 20 carbon atoms, a represents an integer of 1 to 10, and each of $B^2$ and $B^3$, if present in a plural number, is respectively independent, and may be the same as or different from each other;

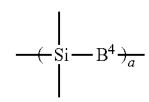

(IV)

wherein $B^4$ represents a single bond or a hydrocarbon group having 1 to 20 carbon atoms, a represents an integer of 1 to 10, and $B^4$, if present in a plural number, is respectively independent, and may be the same as or different from each other; and

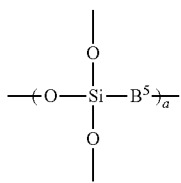
(V)

wherein $B^5$ represents a single bond or a hydrocarbon group having 1 to 20 carbon atoms, a represents an integer of 1 to 10, and $B^5$, if present in a plural number, is respectively independent, and may be the same as or different from each other.

[10]
A method for producing the modified conjugated diene-based polymer according to any one of [1] to [9], comprising steps of:
polymerizing at least a conjugated diene compound using an organomonolithium compound as a polymerization initiator to give a conjugated diene-based polymer; and
reacting the conjugated diene-based polymer with a coupling agent having hexa- or more functional groups, with a mole number of the functional groups of the coupling agent being 0.8 mol or more and 1.2 mol or less based on a mole of an organomonolithium compound used in the polymerization step.

The method for producing the modified conjugated diene-based polymer according to [10], wherein a compound represented by following formula (VI) is used as the coupling agent:

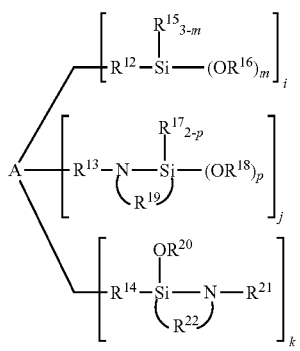
(VI)

wherein $R^{12}$ to $R^{14}$ each independently represent a single bond or an alkylene group having 1 to 20 carbon atoms, $R^{15}$ to $R^{18}$ and $R^{20}$ each independently represent an alkyl group having 1 to 20 carbon atoms, $R^{19}$ and $R^{22}$ each independently represent an alkylene group having 1 to 20 carbon atoms, $R^{21}$ represents an alkyl group or a trialkylsilyl group having 1 to 20 carbon atoms, m represents an integer of 1 to 3, p represents 1 or 2, each of $R^{12}$ to $R^{22}$, m and p, if present in a plural number, is respectively independent, and may be the same as or different from each other, i represents an integer of 0 to 6, j represents an integer of 0 to 6, k represents an integer of 0 to 6, (i+j+k) is an integer of 3 to 10, ((m−1)×i+p×j+k) represents an integer of 6 to 30, and A represents hydrocarbon group having 1 to 20 carbon atoms, or an organic group having at least one atom selected from the group consisting of an oxygen atom, a nitrogen atom, a silicon atom, a sulfur atom and a phosphorous atom, and not having active hydrogen.

[12]
The method for producing the modified conjugated diene-based polymer according to [11], wherein A in the formula (VI) represents any one of following formulas (II) to (V):

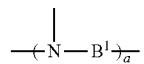
(II)

wherein $B^1$ represents a single bond or a hydrocarbon group having 1 to 20 carbon atoms, a represents an integer of 1 to 10, and $B^1$, if present in a plural number, is respectively independent, and may be the same as or different from each other;

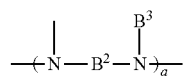
(III)

wherein $B^2$ represents a single bond or a hydrocarbon group having 1 to 20 carbon atoms, $B^3$ represents an alkyl group having 1 to 20 carbon atoms, a represents an integer of 1 to 10, and each of $B^2$ and $B^3$, if present in a plural number, is respectively independent, and may be the same as or different from each other;

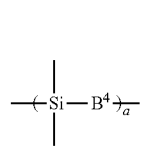
(IV)

wherein $B^4$ represents a single bond or a hydrocarbon group having 1 to 20 carbon atoms, a represents an integer of 1 to 10, and $B^4$, if present in a plural number, is respectively independent, and may be the same as or different from each other; and

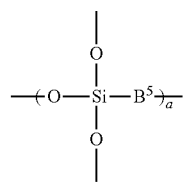
(V)

wherein $B^5$ represents a single bond or a hydrocarbon group having 1 to 20 carbon atoms, a represents an integer of 1 to 10, and $B^5$, if present in a plural number, is respectively independent, and may be the same as or different from each other.

[13]
The method for producing the modified conjugated diene-based polymer according to [12], wherein A in the formula (VI) represents the formula (II) or the formula (III), and k represents 0 (zero).

[14]
A rubber composition, comprising:
a rubber component containing the modified conjugated diene-based polymer according to any one of [1] to [9] in an amount of 10% by mass or more; and a silica-based filler in an amount of 5.0 parts by mass or more and 150 parts by mass or less based on 100 parts by mass of the rubber component.

[15]

A tire comprising the rubber composition according to [14].

Advantageous Effects of Invention

According to the present invention, a modified conjugated diene-based polymer excellent in processability obtained when used for obtaining a vulcanizate, and when in the form of a vulcanizate, having excellent balance between a low hysteresis loss property and wet skid resistance, and having excellent abrasion resistance can be attained.

BRIEF DESCRIPTION OF DRAWINGS

FIG. 1 shows a graph for explaining a relational expression between ML and Mw, wherein Mooney viscosity $ML_{1+4}$ (100° C.) measured at 100° C. is represented by ML and a weight average molecular weight measured by GPC is represented by Mw.

FIG. 2 shows a schematic diagram of a molecular weight distribution curve, obtained by GPC using a polystyrene-based column, of a modified conjugated diene-based copolymer A of Example 1.

FIG. 3 shows a schematic diagram of a molecular weight distribution curve, obtained by GPC using a polystyrene-based column, of a modified conjugated diene-based copolymer H of Comparative Example 3.

FIG. 4 shows a schematic diagram of a molecular weight distribution curve, obtained by GPC using a polystyrene-based column, of a modified conjugated diene-based copolymer I of Comparative Example 4.

DESCRIPTION OF EMBODIMENTS

Now, an embodiment for practicing the present invention (hereinafter referred to as the "present embodiment") will be described in detail, and it is noted that the present invention is not limited to the following description but may be variously modified within the scope thereof.

[Modified Conjugated Diene-based Polymer]

In a modified conjugated diene-based polymer of the present embodiment, a ratio of a coupling polymer obtained by gel permeation chromatography (hereinafter sometimes simply referred to as GPC) is 70% by mass or more based on a total amount of the modified conjugated diene-based polymer, a modification ratio obtained by adsorption GPC is 70% by mass or more based on a total amount of the modified conjugated diene-based polymer, and when Mooney viscosity $ML_{1+4}$ (100° C.) measured at 100° C. is represented by ML and a weight average molecular weight obtained by GPC is represented by Mw, ML≤1.8 (Mw× $10^{-4}$)−31.5, and Mooney viscosity $ML_{1+4}$ (100° C.) measured at 100° C. is 30 to 150.

Owing to the above-described structure, the modified conjugated diene-based polymer of the present embodiment is excellent in processability obtained when used for obtaining a vulcanizate, and when in the form of a vulcanizate, excellent in balance between a low hysteresis loss property and wet skid resistance and in abrasion resistance.

<Conjugated Diene-Based Polymer Chain>

The modified conjugated diene-based polymer of the present embodiment preferably comprises a coupling residue and a conjugated diene-based polymer chain bonded to the coupling residue.

The "conjugated diene-based polymer chain" of the modified conjugated diene-based polymer of the present embodiment refers to a constituent unit, bonded to the coupling residue, of the modified conjugated diene-based polymer, and is a constituent unit derived from a conjugated diene-based polymer and generated, for example, through a reaction between the conjugated diene-based polymer and a coupling agent described later.

<Coupling Residue>

The "coupling residue" of the modified conjugated diene-based polymer of the present embodiment refers to a constituent unit, bonded to the conjugated diene-based polymer chain, of the modified conjugated diene-based polymer, and is a constituent unit derived from the coupling agent and generated through the reaction between the conjugated diene-based polymer and the coupling agent described later.

<Coupling Ratio>

In the modified conjugated diene-based polymer of the present embodiment, a ratio of the coupling polymer (hereinafter also referred to as the "coupling ratio") obtained by GPC (gel permeation chromatography) is 70% by mass or more based on a total amount of the modified conjugated diene-based polymer.

The coupling ratio of the modified conjugated diene-based polymer of the present embodiment can be obtained as follows:

First, a molecular weight distribution curve, obtained by GPC, of the modified conjugated diene-based polymer of the present embodiment is used to separately obtain a sum of a conjugated diene-based polymer peak corresponding to a component not reacted with the coupling agent and having the lowest molecular weight and a modified conjugated diene-based polymer peak resulting from a reaction between one molecule of the coupling agent and one molecule of the conjugated diene-based polymer (hereinafter referred to as the "non-coupling polymer peak"), and a "coupling polymer peak" corresponding to a high molecular weight component in which two or more molecules of the conjugated diene-based polymer chain are bonded via the coupling residue.

Here, if the "coupling polymer peak" includes a plurality of peaks, a sum of these peaks is defined as the "coupling polymer peak".

A ratio of the "coupling polymer peak" in the entire mass expressed in percentage corresponds to the coupling ratio (% by mass).

The coupling ratio of the modified conjugated diene-based polymer of the present embodiment is preferably 75% by mass or more, and more preferably 80% by mass or more.

If the coupling ratio is 70% by mass or more, the processability obtained when used for obtaining a vulcanizate, the balance between the low hysteresis loss property and the wet skid resistance, and the abrasion resistance obtained when in the form of a vulcanizate become more excellent.

The measurement by GPC can be performed by a method described in examples below.

The coupling ratio of the modified conjugated diene-based polymer can be controlled by adjusting, in producing the modified conjugated diene-based polymer of the present embodiment, the number of functional groups and the addition amount of the coupling agent, and the like.

<Modification Ratio>

In the modified conjugated diene-based polymer of the present embodiment, a modification ratio obtained by the adsorption GPC (hereinafter sometimes simply referred to as the "modification ratio") is 70% by mass or more based on a total amount of the modified conjugated diene-based polymer.

The modification ratio obtained by the adsorption GPC can be measured as follows:

First, measurement is performed by the adsorption GPC using a column in which the modified conjugated diene-based polymer is adsorbed, and by non-adsorption GPC using a column in which the modified conjugated diene-based polymer is not adsorbed. A mass of an adsorbed polymer obtained on the basis of a difference between these GPCs and expressed in percentage in the entire mass corresponds to the modification ratio (% by mass).

The modification ratio obtained by the adsorption GPC can be specifically obtained by a method described in the examples below.

The modification ratio of the modified conjugated diene-based polymer of the present embodiment is preferably 75% by mass or more, and more preferably 80% by mass or more.

If the modified conjugated diene-based polymer of the present embodiment is, for example, a modified conjugated diene-based polymer having, in a molecule, an amine structure or a basic nitrogen atom, a silica-based column can be used in the adsorption GPC and a polystyrene-based column can be used in the non-adsorption GPC. In this case, the measurement of the modification ratio by the adsorption GPC means measurement of a content ratio of a polymer having the amine structure or the basic nitrogen atom.

If the modification ratio is 70% by mass or more, the processability obtained when used for obtaining a vulcanizate, the balance between the low hysteresis loss property and the wet skid resistance, and the abrasion resistance obtained when in the form of a vulcanizate become more excellent.

The modification ratio of the modified conjugated diene-based polymer can be controlled by adjusting, in a reaction step of reacting the coupling agent in producing the modified conjugated diene-based polymer of the present embodiment, reaction conditions such as the addition amount of the coupling agent, the reaction temperature and the reaction time.

The modified conjugated diene-based polymer of the present embodiment preferably has a nitrogen atom and/or a silicon atom.

If the modified conjugated diene-based polymer of the present embodiment has a nitrogen atom and/or a silicon atom, the processability obtained when used for obtaining a vulcanizate, the balance between the low hysteresis loss property and the wet skid resistance, and the abrasion resistance obtained when in the form of a vulcanizate become excellent.

A silicon atom can be introduced into the modified conjugated diene-based polymer as a coupling residue by, for example, reacting the conjugated diene-based polymer and a coupling agent having a silicon atom. Whether or not the modified conjugated diene-based polymer has a silicon atom can be checked through metal analysis by a method described in the examples below.

A nitrogen atom can be introduced into the modified conjugated diene-based polymer as a coupling agent residue by, for example, using a polymerization initiator having a nitrogen atom as a polymerization initiator of the conjugated diene-based polymer described later, or reacting the conjugated diene-based polymer and a coupling agent having a nitrogen atom. Whether or not the modified conjugated diene-based polymer has a nitrogen atom can be checked depending on adsorption onto a specific column by a method described in the examples below.

<Relational Expression Between Mooney Viscosity and Weight Average Molecular Weight>

In the modified conjugated diene-based polymer of the present embodiment, when Mooney viscosity $ML_{1+4}$ (100° C.) measured at 100° C. is represented by ML and the weight average molecular weight obtained by GPC is represented by Mw, the relational expression of $ML \leq 1.8 (Mw \times 10^{-4}) - 31.5$ is satisfied.

This relational expression is described in detail.

FIG. 1 shows a graph illustrating the relationship between Mw and ML of a modified conjugated diene-based polymer.

It is found, from FIG. 1, that in a six branched modified conjugated diene-based polymer in which six conjugated diene-based polymer chains are bonded to one coupling residue, $(Mw \times 10^{-4})$ and ML are in a relationship expressed by a straight line 1 having a slope of about 1.8 and an intercept of about −34.7.

Similarly, in a four branched modified conjugated diene-based polymer, they are found to be in a relationship expressed by a straight line 2 having a slope of about 1.8 and an intercept of about −15.8.

Accordingly, in a five branched modified conjugated diene-based polymer, they are presumed to be in a relationship expressed by a straight line 3 having a slope of about 1.8 and an intercept of about −25.2, namely, having the same slope as the straight lines 1 and 2 and positioned in the middle between the straight lines 1 and 2.

The present inventors have found the following as a result of earnest studies: Assuming that a distance from the straight line 3 to the straight line 1 is 1, a modified conjugated diene-based polymer plotted on, or lower than, a straight line 4, positioned in a position corresponding to a distance of ⅔, having a slope of about 1.8 and an intercept of about −31.5, namely, a modified conjugated diene-based polymer satisfying the relational expression of $ML \leq 1.8 (Mw \times 10^{-4}) - 31.5$, contains a six branched polymer in a high ratio, and therefore, the processability obtained when used for obtaining a vulcanizate, the balance between the low hysteresis loss property and the wet skid resistance, and the abrasion resistance obtained when in the form of a vulcanizate tend to be excellent. Accordingly, the modified conjugated diene-based polymer of the present embodiment satisfies $ML \leq 1.8 (Mw \times 10^{-4}) - 31.5$.

FIG. 1 also illustrates the relationship between Mw and ML in modified conjugated diene-based polymers of Example 1, Comparative Example 3 and Comparative Example 4 described in [Examples] below. Thus, the relational expression is satisfied in Example 1 and Comparative Example 3.

In a modified conjugated diene-based polymer, if a ratio of a six or more branched polymer is small, the above-described relational expression is not satisfied even when the coupling ratio is 70% by mass or more. A modified conjugated diene-based polymer containing a six or more branched polymer as a principal component tends to satisfy the relational expression.

Herein, the term "principal component" refers to a component contained in an amount of 50% by mass or more.

Besides, even if a modified conjugated diene-based polymer satisfies the above-described relational expression, if the requirements of the coupling ratio of 70% by mass or more and the modification ratio of 70% by mass or more are not met, the advantageous effects of the present invention, that is, being excellent in the processability obtained when used for obtaining a vulcanizate, and in the balance between the low hysteresis loss property and the wet skid resistance and the abrasion resistance obtained when in the form of a vulcanizate, cannot be attained. This is obvious from comparison between examples and comparative examples described below.

The modified conjugated diene-based polymer of the present embodiment satisfies a relational expression of preferably ML≤1.8 (Mw×10$^{-4}$)–33.0, more preferably ML≤1.8 (Mw×10$^{-4}$)–36.7, further preferably ML≤1.8 (Mw×10$^{-4}$)–40.4, and still further preferably ML≤1.8 (Mw×10$^{-4}$)–44.2.

There is a tendency that the number of branches of the polymer is larger as the numerical value of the intercept is smaller, and if the relationship of ML≤1.8 (Mw×10$^{-4}$)–44.2 is satisfied, a ratio of eight or more branched polymers is high. Accordingly, the processability obtained when used for obtaining a vulcanizate, the balance between the low hysteresis loss property and the wet skid resistance, and the abrasion resistance obtained when in the form of a vulcanizate tend to be more excellent. In particular, the processability obtained when used for obtaining a vulcanizate tends to be excellent.

If a modified conjugated diene-based polymer comprises eight or more branched polymers as the principal component, this relational expression tends to be satisfied by appropriately setting the modification ratio and the coupling ratio.

In a modified conjugated diene-based polymer, there is a tendency that the relationship of ML≤1.8 (Mw×10$^{-4}$)–31.5 can be easily controlled by adjusting the number of branches of the polymer and the content of a six or more branched polymer.

As described above, from the viewpoint of the processability obtained when used for obtaining a vulcanizate, and the balance between the low hysteresis loss property and the wet skid resistance obtained when in the form of a vulcanizate, the modified conjugated diene-based polymer of the present embodiment preferably has a branch structure including six or more branches, preferably has a branch structure including seven or more branches, and preferably has a branch structure including eight or more branches.

The number of branches of the branch structure in the modified conjugated diene-based polymer of the present embodiment can be controlled by adjusting a stoichiometric ratio of an active end of the conjugated diene-based polymer and the addition amount of a modification agent.

<Mooney Viscosity>

The modified conjugated diene-based polymer of the present embodiment has Mooney viscosity ML$_{1+4}$ (100° C.) measured at 100° C. of 30 to 150.

If Mooney viscosity falls in the above-described range, there is a tendency that the processability obtained when used for obtaining a vulcanizate and the balance between the low hysteresis loss property and the wet skid resistance obtained when in the form of a vulcanizate are excellent, and in addition, the abrasion resistance is excellent.

Mooney viscosity ML$_{1+4}$ (100° C.) is preferably 40 or more and 120 or less, and more preferably 45 or more and 100 or less.

Mooney viscosity is measured by using a non-oil-extended modified conjugated diene-based polymer Mooney viscosity can be measured by a method described in the examples below.

Mooney viscosity of the modified conjugated diene-based polymer of the present embodiment can be controlled by adjusting, in a polymerization step, the amounts of a polymerization initiator and a monomer, the polymerization temperature and the polymerization time.

<Weight Average Molecular Weight (Mw)>

The modified conjugated diene-based polymer of the present embodiment has a weight average molecular weight (Mw) of preferably 200,000 or more and 2,000,000 or less. Besides, from the viewpoint of the processability, the modified conjugated diene-based polymer of the present embodiment comprises a modified conjugated diene-based polymer having a molecular weight of 2,000,000 or more in an amount preferably less than 0.3% by mass, more preferably 0.2% by mass or less, and further preferably 0.15% by mass or less based on the total amount of the modified conjugated diene-based polymer. If the weight average molecular weight falls in the above-described range, the processability obtained when used for obtaining a vulcanizate tends to be more excellent.

The weight average molecular weight of the modified conjugated diene-based polymer of the present embodiment is more preferably 400,000 or more and 1,800,000 or less, still more preferably 400,000 or more and 1,000,000 or less, and further more preferably 500,000 or more and 1,000,000 or less.

<Molecular Weight Distribution>

In the modified conjugated diene-based polymer of the present embodiment, a molecular weight distribution (Mw/Mn) expressed as a ratio of the weight average molecular weight (Mw) to a number average molecular weight (Mn) is preferably 1.10 to 1.80, more preferably 1.15 to 1.70, and still more preferably 1.18 to 1.55. If the modified conjugated diene-based polymer has a molecular weight distribution falling in this range, the balance between the low hysteresis loss property and the wet skid resistance obtained when in the form of a vulcanizate tends to be more excellent.

Besides, from the viewpoint of the balance between the low hysteresis loss property and the wet skid resistance, the modified conjugated diene-based polymer of the present embodiment preferably has two or more molecular weight peaks in GPC, and a molecular weight distribution of the molecular weight peak on the higher molecular weight side is preferably 1.0 to 1.3, more preferably 1.0 to 1.2, and still more preferably 1.0 to 1.1. Here, the molecular weight peak on the higher molecular weight side corresponds to a molecular weight peak of a coupled polymer.

A method for controlling the molecular weight distribution to fall in the above-described range is not limited, and for example, when the polymerization is performed by employing batch mode described later, the number of molecular weight peaks in GPC can be controlled to be two or more, and in addition, the molecular weight distribution of the molecular weight peak on the higher molecular side can be controlled to fall in the above-described range.

Herein, the term "molecular weight" refers to a molecular weight in terms of standard polystyrene obtained by GPC (gel permeation chromatography).

In each of the modified conjugated diene-based polymer and the conjugated diene-based polymer described later, the number average molecular weight, the weight average molecular weight, the molecular weight distribution, and a content of a specific high molecular weight component can be measured by methods described in the examples below.

In a molecular weight curve, obtained by GPC, of the modified conjugated diene-based polymer of the present embodiment, a non-coupling polymer peak and a single coupling polymer peak are preferably detected.

In this case, the balance between the low hysteresis loss property and the wet skid resistance obtained when in the form of a vulcanizate tends to be excellent.

In the modified conjugated diene-based polymer of the present embodiment, when a peak top molecular weight of the coupling polymer, obtained by GPC, of the modified conjugated diene-based polymer is represented by $Mp_1$ and a peak top molecular weight of the non-coupling polymer of the conjugated diene-based polymer chain is represented by $Mp_2$, the following relational expression preferably holds:

$(Mp_1/Mp_2) \geq 3.4$

Besides, the following relational expression more preferably holds:

$(Mp_1/Mp_2) \geq 3.8$

If the above-described relational expression holds, there is a tendency that the processability obtained when used for obtaining a vulcanizate, the balance between the low hysteresis loss property and the wet skid resistance, and the abrasion resistance obtained when in the form of a vulcanizate are more excellent.

Incidentally, $Mp_2$ is preferably 100,000 or more and 800,000 or less, more preferably 120,000 or more and 700,000 or less, and further preferably 150,000 or more and 500,000 or less.

Besides, $Mp_1$ is preferably 200,000 or more and 1,500,000 or less, more preferably 300,000 or more and 1,300,000 or less, and further preferably 400,000 or more and 1,200,000 or less.

$Mp_1$ and $Mp_2$ can be obtained by a method described in the examples below.

Besides, the value $(Mp_1/Mp_2)$ can be controlled by using a coupling agent having hexa- or more functional groups, and stoichiometrically adjusting the active end of the conjugated diene-based polymer and the addition amount of the coupling agent.

Incidentally, if $(Mp_1/Mp_2) \geq 3.4$, there is a tendency that six or more conjugated diene-based polymer chains are bonded to one coupling residue in the principal component of the modified conjugated diene-based polymer.

Alternatively, if $(Mp_1/Mp_2) \geq 3.8$, there is a tendency that eight or more conjugated diene-based polymer chains are bonded to one coupling residue in the principal component of the modified conjugated diene-based polymer.

The modified conjugated diene-based polymer of the present embodiment has a silicon atom, and at least one of the silicon atom is preferably a silicon atom constituting an alkoxysilyl group having 1 to 20 carbon atoms or silanol group. Thus, when formed into a composition together with silica, the alkoxysilyl group or the silanol group reacts with the silica to improve the dispersibility of the silica, and hence, the processability obtained when used for obtaining a vulcanizate, and the balance between the low hysteresis loss property and the wet skid resistance obtained when in the form of a vulcanizate tend to be excellent.

Here, the silicon atom is preferably derived from the coupling residue constituting the modified conjugated diene-based polymer.

In the production process of this modified conjugated diene-based polymer, the coupling agent used in a coupling reaction step is preferably a compound having a silicon atom, the silicon atom forming an alkoxysilyl group, a halogenated silyl group, or an aza-silyl group having 1 to 20 carbon atoms.

The coupling residue is more preferably a compound having an amine structure or a basic nitrogen atom.

As described above, the modified conjugated diene-based polymer of the present embodiment preferably comprises the coupling residue and the conjugated diene-based polymer chain bonded to the coupling residue, and it is preferable that the coupling residue has a silicon atom and that the conjugated diene-based polymer chain is bonded to the silicon atom of the coupling residue.

Thus, the processability obtained when used for obtaining a vulcanizate, and the balance between the low hysteresis loss property and the wet skid resistance, and the abrasion resistance obtained when in the form of a vulcanizate tend to be more excellent.

In this case, a plurality of conjugated diene-based polymer chains may be bonded to one silicon atom. Alternatively, the conjugated diene-based polymer chain and an alkoxy group or a hydroxy group may be bonded to one silicon atom, so that at least one silicon atom may be a silicon atom bonding to the conjugated diene-based polymer chain and constituting an alkoxysilyl group or a silanol group.

When the modified conjugated diene-based polymer of the present embodiment or the conjugated diene-based polymer not modified yet described later is further hydrogenated in an inert solvent, all or some of double bonds can be converted into saturated hydrocarbon.

In this case, heat resistance and weather resistance can be improved so as to prevent degradation of a product when processed at a high temperature, and the dynamic performance as a rubber tends to be improved. As a result, further excellent performance can be exhibited in various uses including vehicle use.

A hydrogenation rate of an unsaturated double bond based on a conjugated diene compound can be arbitrarily selected in accordance with the purpose, and is not especially limited. When it is used in the form of a vulcanizate, a double bond of a conjugated diene portion preferably partially remains. From this viewpoint, a rate of hydrogenation of the conjugated diene portion in the conjugated diene-based polymer is preferably 3.0% or more and 70% or less, more preferably 5.0% or more and 65% or less, and further preferably 10% or more and 60% or less. In particular, if a vinyl group is selectively hydrogenated, the heat resistance and the dynamic performance tend to be improved.

The hydrogenation rate can be obtained using a nuclear magnetic resonance apparatus (NMR).

A modified conjugated diene-based copolymer of the present embodiment can be made into an oil-extended polymer additionally containing an extender oil.

No matter whether the modified conjugated diene-based copolymer of the present embodiment is non-oil-extended or oil-extended, Mooney viscosity $ML_{1+4}$ measured at 100° C. is preferably 30 or more and 150 or less, more preferably 20 or more and 100 or less, and further preferably 30 or more and 80 or less from the viewpoint of the processability obtained when used for obtaining a rubber vulcanizate and the abrasion resistance obtained when in the form of a vulcanizate.

Mooney viscosity can be measured by a method described in the examples below.

<Modified Conjugated Diene-based Polymer of General Formula (I)>

The modified conjugated diene-based polymer of the present embodiment preferably has a structure represented by the following general formula (I):

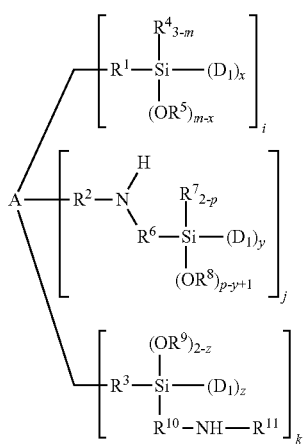

(I)

In formula (I), $D_1$ represents a conjugated diene-based polymer chain, $R^1$ to $R^3$ each independently represent a single bond or an alkylene group having 1 to 20 carbon atoms, $R^4$ and $R^7$ each independently represent an alkyl group having 1 to 20 carbon atoms, $R^5$, $R^8$ and $R^9$ each independently represent a hydrogen atom or an alkyl group having 1 to 20 carbon atoms, $R^6$ and $R^{10}$ each independently represent an alkylene group having 1 to 20 carbon atoms, and $R^{11}$ represents a hydrogen atom or an alkyl group having 1 to 20 carbon atoms.

Besides, m and x each represent an integer of 1 to 3, $x \leq m$, p represents 1 or 2, y represents an integer of 1 to 3, $y \leq (p+1)$, and z represents an integer of 1 or 2.

Each of $D_1$, $R^1$ to $R^{11}$, m, p, x, y and z, if present in a plural number, is respectively independent and may be the same as or different from each other.

Furthermore, i represents an integer of 0 to 6, j represents an integer of 0 to 6, k represents an integer of 0 to 6, (i+j+k) is an integer of 3 to 10, and ((x×i)+(y×j)+(z×k)) is an integer of 6 to 30.

Besides, A represents a hydrocarbon group having 1 to 20 carbon atoms, or an organic group having at least one atom selected from the group consisting of an oxygen atom, a nitrogen atom, a silicon atom, a sulfur atom and a phosphorous atom, and not having active hydrogen.

A hydrocarbon group having 1 to 20 carbon atoms represented by A includes saturated, unsaturated, aliphatic and aromatic hydrocarbon groups.

The organic group not having active hydrogen is an organic group inactivating an active end of the conjugated diene-based polymer. An example of the organic group not having active hydrogen includes an organic group not having a functional group having active hydrogen such as a hydroxyl group (—OH), a secondary amino group (>NH), a primary amino group (—NH$_2$) or a sulfhydryl group (—SH).

Examples of such an organic group include a tertiary amino group and a siloxane group.

Thus, the modified conjugated diene-based polymer tends to be more excellent in the processability obtained when used for obtaining a vulcanizate, in the balance between the low hysteresis loss property and the wet skid resistance, and in the abrasion resistance obtained when in the form of a vulcanizate.

More preferably, m−x=1, y represents an integer of 1 to 2, and y=p and z=1.

Besides, (i+j+k) is more preferably an integer of 3 to 6, and is further preferably 3 or 4.

Furthermore, $R^1$ to $R^3$ each independently represent more preferably a single bond or an alkylene group having 1 to 5 carbon atoms, and further preferably a single bond or an alkylene group having 1 to 3 carbon atoms.

Besides, $R^5$, $R^8$ and $R^9$ each independently represent more preferably a hydrogen atom or an alkyl group having 1 to 5 carbon atoms, still more preferably a hydrogen atom or an alkyl group having 1 to 3 carbon atoms, and further preferably a hydrogen atom, methyl or ethyl.

If the modified conjugated diene-based polymer of the present embodiment is a compound represented by the general formula (I), A in formula (I) preferably represents any one of the following general formulas (II) to (V):

(II)

In formula (II), $B^1$ represents a single bond or a hydrocarbon group having 1 to 20 carbon atoms, and a represents an integer of 1 to 10. $B^1$, if present in a plural number, is respectively independent, and may be the same as or different from each other.

Preferably $B^1$ represents a hydrocarbon group having 1 to 8 carbon atoms.

Besides, a represents preferably an integer of 1 to 4, more preferably an integer of 2 to 4, and further preferably 2.

(III)

In formula (III), $B^2$ represents a single bond or a hydrocarbon group having 1 to 20 carbon atoms, $B^3$ represents an alkyl group having 1 to 20 carbon atoms, and a represents an integer of 1 to 10. Each of $B^2$ and $B^3$, if present in a plural number, is respectively independent, and may be the same as or different from each other.

(IV)

In formula (IV), $B^4$ represents a single bond or a hydrocarbon group having 1 to 20 carbon atoms, and a represents an integer of 1 to 10. $B^4$, if present in a plural number, is respectively independent, and may be the same as or different from each other.

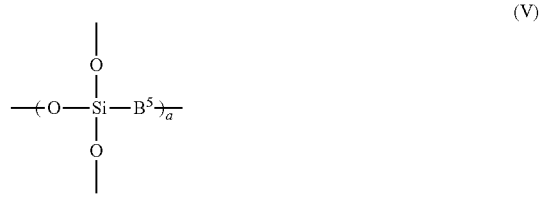

(V)

In formula (V), $B^5$ represents a single bond or a hydrocarbon group having 1 to 20 carbon atoms, and a represents an integer of 1 to 10. $B^5$, if present in a plural number, is respectively independent, and may be the same as or different from each other.

When the modified conjugated diene-based polymer of the present embodiment has the aforementioned structure, the processability obtained when used for obtaining a vulcanizate tends to be more excellent, and the balance between the low hysteresis loss property and the wet skid resistance, and the abrasion resistance obtained when in the form of a vulcanizate tend to be more excellent as the effects of the present embodiment. Besides, such a polymer tends to be practically more easily available.

In general formula (I), it is more preferable that A represents formula (II) or (III) and that k represents 0 (zero).

In general formula (I), it is preferable that A represents formula (II) or (III), that k represents 0 (zero), and that a represents an integer of 2 to 10 in formula (II) or (III).

In general formula (I), it is more preferable that A represents formula (II), that j represents 0 (zero), that k represents 0 (zero), and that a represents an integer of 2 to 4 in formula (II).

In general formula (I), it is further preferable that A represents formula (II), j represents 0 (zero), that k represents 0 (zero), and that a represents 2 in formula (II).

[Method for Producing Modified Conjugated Diene-based Polymer]

A method for producing a modified conjugated diene-based polymer of the present embodiment comprises a polymerization step of polymerizing at least a conjugated diene compound using an organomonolithium compound as a polymerization initiator to give a conjugated diene-based polymer, and a reaction step of reacting the conjugated diene-based polymer with a coupling agent having hexa- or more functional groups with a mole number of the functional groups of the coupling agent being 0.8 mol or more and 1.2 mol or less based on a mol of the organomonolithium compound used in the polymerization step.

According to the method for producing a modified conjugated diene-based polymer of the present embodiment, it is possible to produce a modified conjugated diene-based polymer in which a ratio of a coupling polymer obtained by GPC is 70% by mass or more based on a total amount of the modified conjugated diene-based polymer, and when Mooney viscosity $ML_{1+4}$ (100° C.) measured at 100° C. is represented by ML and a weight average molecular weight obtained by GPC is represented by Mw, $ML \leq 1.8$ (Mw× $10^{-4}$)−31.5, and Mooney viscosity $ML_{1+4}$ (100° C.) measured at 100° C. is 30 to 150.

<Polymerization Step>

In the polymerization step of the method for producing a modified conjugated diene-based polymer of the present embodiment, at least a conjugated diene compound is polymerized using an organomonolithium compound as a polymerization initiator to give a conjugated diene-based polymer.

The polymerization step is preferably performed by polymerization through a growth reaction by living anionic polymerization, and thus, a conjugated diene-based polymer having an active end can be obtained, and there is a tendency that a modified diene-based polymer having a high modification ratio can be obtained.

The conjugated diene-based polymer produced in the <polymerization step> of the method for producing a modified conjugated diene-based polymer of the present embodiment is obtained by polymerizing at least a conjugated diene compound, and is obtained, if necessary, by copolymerizing both a conjugated diene compound and a vinyl-substituted aromatic compound.

The conjugated diene compound is not especially limited as long as it is a polymerizable monomer, and is preferably a conjugated diene compound containing 4 to 12 carbon atoms per molecule, and more preferably a conjugated diene compound containing 4 to 8 carbon atoms.

Examples of such a conjugated diene compound include, but are not limited to, 1,3-butadiene, isoprene, 2,3-dimethyl-1,3-butadiene, 1,3-pentadiene, 3-methyl-1,3-pentadiene, 1,3-hexadiene and 1,3-heptadiene.

Among these, 1,3-butadiene and isoprene are preferred from the viewpoint of industrial availability.

One of these compounds may be singly used, or two or more of these may be used together.

The vinyl-substituted aromatic compound is not especially limited as long as it is a monomer copolymerizable with the conjugated diene compound, and is preferably a monovinyl aromatic compound.

Examples of the monovinyl aromatic compound include, but are not limited to, styrene, p-methylstyrene, α-methylstyrene, vinyl ethyl benzene, vinyl xylene, vinyl naphthalene and diphenyl ethylene.

Among these, styrene is preferred from the viewpoint of industrial availability.

One of these compounds may be singly used, or two or more of these may be used together.

If the above-described conjugated diene compound and/or the vinyl-substituted aromatic compound contains any of allenes, acetylenes and the like as an impurity, it is apprehended that the reaction in the reaction step described later may be impaired. Therefore, the sum of content concentrations (masses) of these impurities is preferably 200 ppm or less, more preferably 100 ppm or less, and further preferably 50 ppm or less.

Examples of the allenes include propadiene and 1,2-butadiene.

Examples of the acetylenes include ethyl acetylene and vinyl acetylene.

The conjugated diene-based polymer may be a random copolymer or a block copolymer. In order to form the conjugated diene-based polymer as a rubber-like polymer, the conjugated diene compound is used in an amount of preferably 40% by mass or more and more preferably 55% by mass or more based on the amount of all monomers used in the conjugated diene-based polymer.

Examples of the random copolymer include, but are not limited to, a random copolymer containing two or more conjugated diene compounds such as a butadiene-isoprene random copolymer, and a random copolymer containing conjugated diene and the vinyl-substituted aromatic compound such as a butadiene-styrene random copolymer, an isoprene-styrene random copolymer or a butadiene-isoprene-styrene random copolymer.

A composition distribution of each monomer contained in a copolymer chain is not especially limited, and examples include a completely random copolymer whose composition is almost statistically random, and a tapered (gradient) random copolymer whose composition is distributed in a tapered manner.

A bonding mode of the conjugated diene, namely, the composition of a 1,4-bond, a 1,2-bond or the like may be homogeneous or distributed.

Examples of the block copolymer include, but are not limited to, a two-block (diblock) copolymer consisting of two blocks, a three-block (tri-block) copolymer consisting of three blocks, and a four-block (tetra-block) copolymer consisting of four blocks.

A polymer constituting every block may be a polymer containing one monomer or a copolymer containing two or more monomers. Assuming that a polymer block containing 1,3-butadiene is expressed as "B", a copolymer of 1,3-butadiene and isoprene is expressed as "B/I", a copolymer of 1,3-butadiene and styrene is expressed as "B/S" and a polymer block containing styrene is expressed as "S", the block copolymer is expressed as a B-B/I two-block copolymer, a B-B/S two-block copolymer, a S-B two-block copolymer, a B-B/S-S three-block copolymer, a S-B-S three-block copolymer, a S-B-S-B four-block copolymer or the like.

In the above-described formula, there is no need to always clearly define a boundary between blocks. Besides, if one polymer block is a copolymer containing two monomers A and B, the monomers A and B may be distributed homogeneously or in a tapered manner in the block.

In the <polymerization step> of the method for producing a modified conjugated diene-based polymer of the present embodiment, at least an organomonolithium compound is used as the polymerization initiator.

Examples of the organomonolithium compound include, but are not limited to, a low molecular weight compound and an organomonolithium compound of a solubilized oligomer.

Another example of the organomonolithium compound includes a compound having, as a bonding mode between an organic group and lithium therein, a carbon-lithium bond, a nitrogen-lithium bond or a tin-lithium bond.

The amount of the organomonolithium compound to be used as a polymerization initiator is preferably determined on the basis of the molecular weight of the target conjugated diene-based polymer or modified conjugated diene-based polymer. There is a tendency that a ratio of the amount of a monomer such as the conjugated diene compound to be used to the amount of the polymerization initiator to be used relates to the degree of polymerization, namely, the number average molecular weight and the weight average molecular weight. Accordingly, in order to increase the molecular weight, adjustment may be made to reduce the amount of the polymerization initiator, and in order to reduce the molecular weight, the adjustment may be made to increase the amount of the polymerization initiator.

The organomonolithium compound is preferably an alkyl lithium compound having a substituted amino group or dialkylamino lithium. In this case, a conjugated diene-based polymer having, at a polymerization starting end, a nitrogen atom corresponding to a constituent element of an amino group is obtained.

The substituted amino group refers to an amino group having no active hydrogen or having a structure in which active hydrogen is protected.

Examples of an alkyl lithium compound containing an amino group having no active hydrogen include, but are not limited to, 3-dimethylaminopropyl lithium, 3-diethylaminopropyl lithium, 4-(methylpropylamino)butyl lithium and 4-hexamethyleneiminobutyl lithium.

Examples of an alkyl lithium compound containing an amino group having a structure in which active hydrogen is protected include, but are not limited to, 3-bistrimethylsilylaminopropyl lithium and 4-trimethylsilylmethylaminobutyl lithium.

Examples of the dialkylamino lithium include, but are not limited to, lithium dimethylamide, lithium diethylamide, lithium dipropylamide, lithium dibutylamide, lithium di-n-hexylamide, lithium diheptylamide, lithium diisopropylamide, lithium dioctylamide, lithium-di-2-ethylhexylamide, lithium didecylamide, lithium ethylpropylamide, lithium ethylbutylamide, lithium ethylbenzylamide, lithium methylphenetylamide, lithium hexamethyleneimide, lithium pyrrolidide, lithium piperidide, lithium heptamethyleneimide, lithium morpholide, 1-lithioazacyclooctane, 6-lithio-1,3,3-trimethyl-6-azabicyclo[3.2.1] octane and 1-lithio-1,2,3,6-tetrahydropyridine.

Such an organomonolithium compound having a substituted amino group can be reacted with a small amount of a polymerizable monomer, such as 1,3-butadiene, isoprene or styrene, to be used as an organomonolithium compound of a soluble oligomer.

The organomonolithium compound is preferably an alkyl lithium compound. In this case, a conjugated diene-based polymer having an alkyl group at a polymerization starting end can be obtained.

Examples of the alkyl lithium compound include, but are not limited to, n-butyllithium, sec-butyllithium, tert-butyllithium, n-hexyllithium, benzyllithium, phenyllithium and stilbene lithium. From the viewpoint of the industrial availability and the controllability of the polymerization reaction, the alkyl lithium compound is preferably n-butyllithium or sec-butyllithium.

One of these organomonolithium compounds may be singly used, or two or more of these may be used together. Alternatively, another organic metal compound may be used together.

Examples of such another organic metal compound include alkaline earth metal compounds, other alkaline metal compounds and other organic metal compounds.

Examples of the alkaline earth metal compounds include, but are not limited to, organic magnesium compounds, organic calcium compounds and organic strontium compounds.

In addition, the examples include alkoxide, sulfonate, carbonate and amide compounds of the alkaline earth metals.

Examples of the organic magnesium compounds include dibutyl magnesium and ethyl butyl magnesium.

Examples of the other organic metal compounds include organic aluminum compounds.

Examples of a polymerization reaction mode employed in the polymerization step include, but are not limited to, for example, batch and continuous polymerization reaction modes.

As a reactor for the batch mode, for example, a tank reactor equipped with a stirrer is used.

It is preferable, in the batch mode, that a monomer, an inert solvent and a polymerization initiator are first fed to the reactor, the monomer is continuously or intermittently additionally fed if necessary during the polymerization, a polymer solution containing a polymer is obtained in the reactor, and the polymer solution is discharged after completing the polymerization.

In the continuous mode, a plug flow reactor can be preferably used. It is preferable, in the continuous mode, that a monomer, an inert solvent and a polymerization initiator are continuously fed to the reactor, a polymer solution containing a polymer is obtained in the reactor, and the polymer solution is continuously discharged.

In the polymerization step, the polymerization is performed preferably in an inert solvent.

Examples of the inert solvent include hydrocarbon-based solvents such as saturated hydrocarbon and aromatic hydrocarbon. Specific examples of the hydrocarbon-based solvent include, but are not limited to, aliphatic hydrocarbons such as butane, pentane, hexane and heptane; alicyclic hydrocarbons such as cyclopentane, cyclohexane, methylcyclopentane and methylcyclohexane; aromatic hydrocarbons such as benzene, toluene and xylene; and a hydrocarbon containing a mixture of any of these.

Impurities of allenes and acetylenes are preferably treated with an organic metal compound before the solvent is supplied to the polymerization reaction because thus, a conjugated diene-based polymer having an active end in a high concentration tends to be obtained, and a modified conjugated diene-based polymer having a high modification ratio tends to be obtained.

In the polymerization step, a polar compound may be added. If a polar compound is added, an aromatic vinyl compound can be randomly copolymerized with the conjugated diene compound, and can be used also as a vinylation agent for controlling a microstructure of a conjugated diene portion.

Besides, it is advantageous for, for example, acceleration of a polymerization starting reaction and a growth reaction.

Examples of the polar compound include, but are not limited to, ethers such as tetrahydrofuran, diethyl ether, dioxane, ethylene glycol dimethyl ether, ethylene glycol dibutyl ether, diethylene glycol dimethyl ether, diethylene glycol dibutyl ether, dimethoxybenzene and 2,2-bis(2-oxolanyl)propane; tertiary amine compounds such as tetramethylethylenediamine, dipiperidinoethane, trimethylamine, triethylamine, pyridine and quinuclidine; alkaline metal alkoxide compounds such as potassium-tert-amylate, potassium-tert-butylate, sodium-tert-butylate and sodium amylate; and phosphine compounds such as triphenylphosphine.

One of these polar compounds may be singly used, or two or more of these may be used together.

The amount of the polar compound to be used is not especially limited but can be selected in accordance with the purpose or the like, and is preferably 0.01 mol or more and 100 mol or less per mol of the polymerization initiator. Such a polar compound (a vinylation agent) can be used, as a microstructure modifier for a conjugated diene portion of the polymer, in an appropriate amount in accordance with a desired amount of bound vinyl. There is a tendency that many polar compounds simultaneously have an effective randomizing effect in copolymerization of a conjugated diene compound and an aromatic vinyl compound, and can be used as a modifier for the distribution of the aromatic vinyl compound and the amount of a styrene block. As a method for randomizing the conjugated diene compound and the aromatic vinyl compound, for example, a method as described in Japanese Patent Laid-Open No. 59-140211 in which a copolymerization reaction is started with the whole amount of styrene and a part of 1,3-butadiene with the rest of 1,3-butadiene intermittently added during the copolymerization reaction may be employed.

In the polymerization step, a polymerization temperature is preferably a temperature at which the living anionic polymerization proceeds, and from the viewpoint of productivity, is preferably 0° C. or more and 120° C. or less. If the polymerization temperature falls in this range, there is a tendency that a reaction amount of the coupling agent reacted to the active end can be sufficiently attained after completing the polymerization. The polymerization temperature is more preferably 50° C. or more and 100° C. or less.

The conjugated diene-based polymer obtained by the polymerization step before the <reaction step> described below has Mooney viscosity, measured at 100° C., of preferably 10 or more and 60 or less, more preferably 15 or more and 50 or less, and further preferably 20 or more and 45 or less. If Mooney viscosity of the conjugated diene-based polymer falls in this range, the modified conjugated diene-based polymer of the present embodiment tends to be excellent in the processability and the abrasion resistance.

The amount of bound conjugated diene in the modified conjugated diene-based polymer of the present embodiment or the conjugated diene-based polymer obtained before the <reaction step> described below is not especially limited, and is preferably 40% by mass or more and 100% by mass or less, and more preferably 55% by mass or more and 80% by mass or less.

Besides, the amount of bound aromatic vinyl in the modified conjugated diene-based polymer of the present embodiment or the conjugated diene-based polymer obtained before the <reaction step> described below is not especially limited, and is preferably 0% by mass or more and 60% by mass or less, and more preferably 20% by mass or more and 45% by mass or less.

If the amount of bound conjugated diene and the amount of bound aromatic vinyl respectively fall in the above-described ranges, the balance between the low hysteresis loss property and the wet skid resistance, and the abrasion resistance obtained when in the form of a vulcanizate tend to be more excellent.

Here, the amount of bound aromatic vinyl can be measured using ultraviolet absorption of a phenyl group, and based on this, the amount of bound conjugated diene can be also obtained. Specifically, these amounts can be measured in accordance with a method described in the examples below.

In the modified conjugated diene-based polymer of the present embodiment or the conjugated diene-based polymer obtained before the <reaction step> described below, the amount of bound vinyl in a conjugated diene bond unit is not especially limited, and is preferably 10% by mole or more and 75% by mole or less, and more preferably 20% by mole or more and 65% by mole or less.

If the amount of bound vinyl falls in the above-described range, the balance between the low hysteresis loss property and the wet skid resistance, and the abrasion resistance obtained when in the form of a vulcanizate tend to be more excellent. Here, if the branched modified diene-based polymer is a copolymer of butadiene and styrene, the amount of bound vinyl (the amount of a 1,2-bond) in a butadiene bond unit can be obtained by Hampton method (R. R. Hampton, Analytical Chemistry, 21, 923 (1949)).

Specifically, it can be measured by a method described in the examples below.

As for the microstructure of the modified conjugated diene-based polymer of the present embodiment, if the amounts of the aforementioned bonds in the modified conjugated diene-based polymer fall respectively in the above-described ranges and the glass transition temperature (Tg) of the modified conjugated diene-based polymer is −45° C. or more and −15° C. or less, there is a tendency that a vulcanizate more excellent in the balance between the low hysteresis loss property and the wet skid resistance can be obtained. The glass transition temperature is defined as a peak top (an inflection point) of a DSC differential curve obtained by recording a DSC curve during temperature increase in a prescribed range in accordance with ISO 22768:2006.

Specifically, it can be measured in accordance with a method described in the examples below.

If the modified conjugated diene-based polymer of the present embodiment is a conjugated diene-aromatic vinyl copolymer, it preferably contains a few or no blocks in which 30 or more aromatic vinyl units are chained. More specifically, if the copolymer is a butadiene-styrene copolymer, in employing a known method in which the copolymer is decomposed by Kolthoff method (a method described by I. M. Kolthoff, et al., J. Polym. Sci. 1, 429 (1946)) to analyze the amount of polystyrene insoluble in methanol, blocks in each of which 30 or more aromatic vinyl units are chained are preferably 5.0% by mass or less, and more preferably 3.0% by mass or less based on the total amount of the modified conjugated diene-based copolymer.

If the conjugated diene-based polymer obtained before the <reaction step> described below of the modified conjugated diene-based polymer of the present embodiment is a conjugated diene-aromatic vinyl copolymer, a large proportion of an aromatic vinyl unit is preferably present singly.

Specifically, if the copolymer is a butadiene-styrene copolymer, when the copolymer is decomposed by employing a method through ozonolysis known as a method of Tanaka et al., (Polymer, 22, 1721 (1981)) to analyze a styrene chain distribution by GPC, it is preferable that the amount of isolated styrene to the whole amount of bound styrene is 40% by mass or more, and that the amount of a chain styrene structure consisting of 8 or more chained styrene is 5% by mass or less. In this case, a resultant vulcanized rubber tends to attain excellent performance of particularly low hysteresis loss.

<Adjustment of Molecular Weight and Molecular Weight Distribution>

The molecular weight of the modified conjugated diene-based polymer of the present embodiment can be controlled, for example, by adjusting the amount of the organomonolithium compound to be used as the polymerization initiator as described above.

Besides, for the molecular weight distribution of the modified conjugated diene-based polymer of the present embodiment, a residence time distribution may be adjusted no matter whether the continuous mode or the batch mode is employed as the polymerization mode. There is a tendency that, for example, if the resistance time distribution is made small, namely, a time distribution of a growth reaction is made narrow, the molecular weight distribution becomes small. In employing the batch mode, a method using a tank reactor equipped with a stirrer, in which stirring is performed sufficiently for obtaining a homogenous composition in the reactor, is preferred, and in employing the continuous mode, a method using a tubular reactor causing little back mix is preferred. In either of the methods, the polymerization is performed preferably by adding the polymerization initiator preferably simultaneously with the monomer, or within a short period of time after addition of the monomer, with the polymerization starting temperature set to, for example, 30° C. or more, and more preferably 40° C. or more so as to increase the polymerization starting rate. Besides, for increasing the starting rate, a polar compound is preferably added to the reaction system.

<Reaction Step>

The method for producing a modified conjugated diene-based polymer of the present embodiment includes the reaction step of reacting the conjugated diene-based polymer obtained in the <polymerization step> described above with a coupling agent having hexa- or more functional groups, with a mole number of the functional groups of the coupling agent being 0.8 mol or more and 1.2 mol or less based on a mol of the organomonolithium compound used in the polymerization step.

When the mole number of the functional groups of the coupling agent is set to the above-described range, the modified conjugated diene-based polymer of the present embodiment tends to satisfy the coupling ratio of the present embodiment, a desired modification ratio and the above-described relational expression between Mooney viscosity and the weight average molecular weight.

The term "hexa- or more functional" means that it has six or more functional groups reacting with the active end of the conjugated diene-based polymer.

For example, a halogenated silyl group has such functional groups in the same number as that of halogens, an aza-silyl group is mono-functional, a carbonyl group is mono-functional, an epoxy group is mono-functional and an ester group is di-functional, and thus, the total number of functional groups of the compound is obtained.

If the coupling agent has an alkoxysilyl group, however, there is a tendency that all alkoxy groups bonded to a silicon atom do not react but one alkoxy group per silicon atom remains in general. Therefore, change in the viscosity of the polymer over time is small, and particularly excellent balance between the low hysteresis loss property and the wet skid resistance can be obtained when in the form of a vulcanizate. Accordingly, the number of functional groups of an alkoxysilyl group is regarded as a value obtained by subtracting one from the number of alkoxy groups bonded to the same silicon atom. More specifically, the number of functional groups of the coupling agent is calculated on the assumption that a trialkoxysilyl group is di-functional, a dialkoxysilyl group is mono-functional and a monoalkoxysilyl group is zero-functional. Also for accurately calculating the amount of the coupling agent to be added, it is significant how the number of functional groups is calculated.

The number of functional groups of the coupling agent is preferably 6 or more and 30 or less, more preferably 6 or more and 20 or less, further preferably 6 or more and 12 or less, and still further preferably 8 or more and 12 or less.

Besides, a compound used as the coupling agent preferably has no active hydrogen. If the coupling agent has no active hydrogen, a side reaction is suppressed, and the coupling ratio, the modification ratio and the relational expression between Mooney viscosity and the weight average molecular weight can be easily adjusted.

In the method for producing a modified conjugated diene-based polymer of the present embodiment, from the viewpoint of adjusting the modification ratio of the resultant modified conjugated diene-based polymer, either of or both of a method in which a conjugated diene-based polymer having, in a molecule, an amine structure or a basic nitrogen atom is used as a compound used as the polymerization initiator in the polymerization step, and a method in which a compound having, in a molecule, an amine structure or a basic nitrogen atom is used as the coupling agent in the reaction step are preferably employed.

If the compound used as the polymerization initiator has, in a molecule, an amine structure or a basic nitrogen atom, a coupling agent having, in a molecule, neither an amine structure nor a basic nitrogen atom can be used.

Examples of the coupling agent having, in a molecule, neither an amine structure nor a basic nitrogen atom include, but are not limited to, 1,3,5-tris(3-trimethoxysilylpropyl) cyclohexane having 6 functional groups, 1,2-bis(trichlorosilyl)ethane having 6 functional groups, tetradecane-2,4,6,8, 10,12-hexaone having 6 functional groups, and bis(3-trichlorosilylpropyl)dichlorosilane having 8 functional groups.

Examples of the coupling agent having, in a molecule, an amine structure or a basic nitrogen atom include, but are not limited to, tris(3-trimethoxysilylpropyl)amine having 6 functional groups, bis(3-trimethoxysilylpropyl)-[3-(2,2-dimethoxy-1-aza-2-silacyclopentane)propyl]amine having 6 functional groups, bis(3-trichlorosilylpropyl)methylamine having 6 functional groups, 1,3,5-tris(diglycidylaminomethyl)cyclohexane having 6 functional groups, and tetrakis (3-trimethoxysilylpropyl)-1,3-propanediamine having 8 functional groups.

The reaction temperature employed in the reaction step is preferably a temperature equivalent to the polymerization temperature of the conjugated diene-based polymer, more preferably 0° C. or more and 120° C. or less, and further preferably 50° C. or more and 100° C. or less.

The reaction time employed in the reaction step is preferably 10 seconds or more, and more preferably 30 seconds or more.

Mixing performed in the reaction step may be either mechanical stirring or stirring with a static mixer or the like.

If the polymerization step is performed in the continuous mode, the reaction step is preferably performed also in the continuous mode.

As a reactor used in the reaction step, for example, a tank or tubular reactor equipped with a stirrer is used.

The coupling agent may be diluted with an inert solvent and continuously supplied to the reactor. If the polymerization step is performed in the batch mode, the reaction step may be performed by a method in which the polymerization reactor is charged with the coupling agent, or a method in which the polymer is transferred to another reactor for performing the reaction step.

A time from the polymerization step to the reaction step is preferably shorter, and is preferably 10 minutes or less, and more preferably 5 minutes or less. In this case, a high coupling ratio and a high modification ratio tend to be obtained.

The time from the polymerization step to the reaction step refers to, in employing, for example, the batch mode in the polymerization step, a time from reaching a polymerization peak temperature to the addition of the coupling agent, and in employing the continuous mode in the polymerization step, a time until the addition of the coupling agent to the solution containing the conjugated diene-based polymer taken out of the reactor.

As the coupling agent having hexa- or more functional groups used in the reaction step, a compound represented by the following general formula (VI) is preferred:

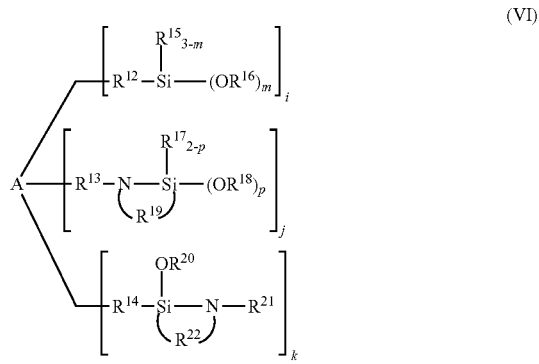

In formula (VI), $R^{12}$ to $R^{14}$ each independently represent a single bond or an alkylene group having 1 to 20 carbon atoms, $R^{15}$ to $R^{18}$ and $R^{20}$ each independently represent an alkyl group having 1 to 20 carbon atoms, $R^{19}$ and $R^{22}$ each independently represent an alkylene group having 1 to 20 carbon atoms, and $R^{21}$ represents an alkyl group or a trialkylsilyl group having 1 to 20 carbon atoms.

Besides, m represents an integer of 1 to 3, and p represents 1 or 2. Each of $R^{12}$ to $R^{22}$, m and p, if present in a plural number, is respectively independent, and may be the same as or different from each other.

Furthermore, i represents an integer of 0 to 6, j represents an integer of 0 to 6, k represents an integer of 0 to 6, and (i+j+k) is an integer of 3 to 10, and ((m−1)×i+p×j+k) represents an integer of 6 to 30.

Besides, A represents a hydrocarbon group having 1 to 20 carbon atoms, or an organic group having at least one atom selected from the group consisting of an oxygen atom, a nitrogen atom, a silicon atom, a sulfur atom and a phosphorous atom, and not having active hydrogen.

A hydrocarbon group having 1 to 20 carbon atoms represented by A includes saturated, unsaturated, aliphatic and aromatic hydrocarbon groups.

The organic group having at least one atom selected from the group consisting of an oxygen atom, a nitrogen atom, a silicon atom, a sulfur atom and a phosphorus atom and not having active hydrogen is an organic group inactivating an active end of the conjugated diene-based polymer. An example of the organic group not having active hydrogen includes an organic group not having a functional group having active hydrogen such as a hydroxyl group (—OH), a secondary amino group (>NH), a primary amino group (—NH$_2$) or a sulfhydryl group (—SH).

Examples of the organic group include a tertiary amino group and a siloxane group.

In formula (VI), (i+j+k) is preferably an integer of 3 to 6, and is more preferably 3 or 4.

Besides, $R^{12}$ to $R^{14}$ each independently represent more preferably a single bond or an alkylene group having 1 to 5 carbon atoms, and further preferably a single bond or an alkylene group having 1 to 3 carbon atoms. $R^{16}$, $R^{18}$ and $R^{20}$ each independently represent more preferably an alkyl group having 1 to 5 carbon atoms, further preferably an alkyl group having 1 to 3 carbon atoms, and still further preferably methyl or ethyl.

The coupling agent represented by the above-described general formula (VI) has at least three silicon-containing functional groups, and the number of kinds of the silicon-containing functional groups is one to three as described above. In other words, the number of types of the silicon-containing functional groups that can be contained in one coupling agent is one to three.

An alkoxysilyl group contained in the coupling agent represented by the general formula (VI) tends to react with the active end of the conjugated diene-based polymer to dissociate alkoxy lithium, and to form a bond between an end of the conjugated diene-based polymer chain and silicon of the coupling residue.

A value obtained by subtracting the number of SiOR groups reduced through the reaction from the total number of SiOR groups contained in one molecule of the coupling agent corresponds to the number of alkoxysilyl groups contained in the coupling residue. An unreacted and remained alkoxysilyl group can be easily changed to silanol (a Si—OH group) with water or the like used in finishing.

Besides, the coupling agent represented by the general formula (VI) has an aza-sila cycle group when j≠0 and/or k≠0.

The aza-sila cycle group forms a >N—Li bond and a bond between the end of the conjugated diene-based polymer and silicon of the coupling residue. It is noted that the >N—Li bond tends to be easily changed to >NH and LiOH with water or the like used in the finishing.

In the reaction step, if the active end of 3 mol of the conjugated diene-based polymer is reacted with 1 mol of trialkoxysilane group having three alkoxy groups per silicon atom, there is a tendency that 1 mol of the alkoxy group remains unreacted although the reaction with the conjugated diene-based polymer occurs up to 2 mol.

If a large amount of alkoxy group remains in the coupling residue, a condensation reaction occurs during the finishing and storage, and hence, the viscosity of the polymer tends to largely change.

In the present embodiment, one alkoxysilyl group is preferably allowed to remain unreacted per silicon atom. In this case, the change in the viscosity of the polymer is small, and hence, particularly excellent balance between the low hysteresis loss property and the wet skid resistance can be obtained when in the form of a vulcanizate.

Examples of the coupling agent represented by the general formula (VI) include, but are not limited to, tris(3-trimethoxysilylpropyl)amine, tris(3-triethoxysilylpropyl)amine, tris(3-tripropoxysilylpropyl)amine, bis(3-trimethoxysilylpropyl)-[3-(2,2-dimethoxy-1-aza-2-silacyclopentane)propyl]amine, tetrakis(3-trimethoxysilylpropyl)-1,3-propanediamine, tris(3-trimethoxysilylpropyl)-[3-(1-methoxy-2-trimethylsilyl-1-sila-2-azacyclopentane)propyl]-1,3-propanediamine, tris(3-trimethoxysilylpropyl)-[3-(1-methoxy-2-methyl-1-sila-2-azacyclopentane)propyl]-1,3-propanediamine, bis(3-triethoxysilylpropyl)-[3-(2,2-diethoxy-1-aza-2-silacyclopentane)propyl]-[3-(1-ethoxy-2-trimethylsilyl-1-sila-2-azacyclopentane)propyl]-1,3-propanediamine, tetrakis(3-trimethoxysilylpropyl)-1,3-bisaminomethylcyclohexane, tris(3-trimethoxysilylpropyl)-[3-(2,2-dimethoxy-1-aza-2-silacyclopentane)propyl]-1,3-bisaminomethylcyclohexane, tetrakis(3-trimethoxysilylpropyl)-1,6-hexamethylenediamine, pentakis(3-trimethoxysilylpropyl)-diethylenetriamine, tris(3-trimethoxysilylpropyl)-methyl-1,3-propanediamine, tetrakis[3-(2,2-dimethoxy-1-aza-2-silacyclopentane)propyl]silane, bis(3-trimethoxysilylpropyl)-bis[3-(2,2-dimethoxy-1-aza-2-silacyclopentane)propyl]silane, tris[3-(2,2-dimethoxy-1-aza-2-silacyclopentane)propyl]-(3-trimethoxysilylpropyl)silane, tris[3-(2,2-dimethoxy-1-aza-2-silacyclopentane)propyl]-[3-(1-methoxy-2-trimethylsilyl-1-sila-2-azacyclopentane)propyl]silane, 3-tris[2-(2,2-dimethoxy-1-aza-2-silacyclopentane)ethoxy]silyl-1-trimethoxysilylpropane, 1-[3-(1-methoxy-2-trimethylsilyl-1-sila-2-azacyclopentane)propyl]-3,4,5-tris(3-trimethoxysilylpropyl)-cyclohexane, 1-[3-(2,2-dimethoxy-1-aza-2-silacyclopentane)propyl]-3,4,5-tris(3-trimethoxysilylpropyl)-cyclohexane, 3,4,5-tris(3-trimethoxysilylpropyl)-cyclohexyl-[3-(2,2-dimethoxy-1-aza-2-silacyclopentane)propyl]ether, (3-trimethoxysilylpropyl)phosphate, bis(3-trimethoxysilylpropyl)-[3-(2,2-dimethoxy-1-aza-2-silacyclopentane)propyl]phosphate, bis[3-(2,2-dimethoxy-1-aza-2-silacyclopentane)propyl]-(3-trimethoxysilylpropyl)phosphate, tris[3-(2,2-dimethoxy-1-aza-2-silacyclopentane)propyl]phosphate, and tris(trimethoxysilyl)isocyanurate, and tris(triethoxysilyl)isocyanurate.

In the formula (VI), A represents preferably any one of the following general formulas (II) to (V):

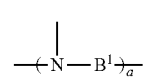

(II)

In formula (II), $B^1$ represents a single bond or a hydrocarbon group having 1 to 20 carbon atoms, and a represents an integer of 1 to 10. $B^1$, if present in a plural number, is respectively independent, and may be the same as or different from each other.

$B^1$ represents preferably a hydrocarbon group having 1 to 8 carbon atoms.

Besides, a represents preferably an integer of 1 to 4, more preferably an integer of 2 to 4, and further preferably 2.

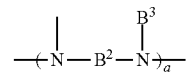

(III)

In formula (III), $B^2$ represents a single bond or a hydrocarbon group having 1 to 20 carbon atoms, $B^3$ represents an alkyl group having 1 to 20 carbon atoms, and a represents an integer of 1 to 10.

Each of $B^2$ and $B^3$, if present in a plural number, is respectively independent, and may be the same as or different from each other.

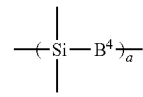

(IV)

In formula (IV), $B^4$ represents a single bond or a hydrocarbon group having 1 to 20 carbon atoms, and a represents an integer of 1 to 10. $B^4$, if present in a plural number, is respectively independent, and may be the same as or different from each other.

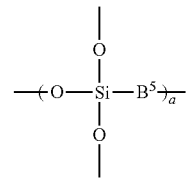

(V)

In formula (V), $B^5$ represents a single bond or a hydrocarbon group having 1 to 20 carbon atoms, and a represents an integer of 1 to 10. $B^5$, if present in a plural number, is respectively independent, and may be the same as or different from each other. Thus, there is a tendency that the modified conjugated diene-based polymer of the present embodiment having more excellent performances can be obtained.

Examples of the coupling agent to be used when A in formula (VI) is represented by formula (II) include, but are not limited to, tris(3-trimethoxysilylpropyl)amine, tris(3- triethoxysilylpropyl)amine, bis(3-trimethoxysilylpropyl)-[3-(2,2-dimethoxy-1-aza-2-silacyclopentane)propyl]amine, bis[3-(2,2-dimethoxy-1-aza-2-silacyclopentane)propyl]-(3-trimethoxysilylpropyl)amine, tris[3-(2,2-dimethoxy-1-aza-2-silacyclopentane)propyl]amine, tris(3-ethoxysilylpropyl) amine, bis(3-triethoxysilylpropyl)-[3-(2,2-diethoxy-1-aza-2-silacylopentane)propyl]amine, bis[3-(2,2-diethoxy-1-aza-2-silacyclopentane)propyl]-(3-triethoxysilylpropyl)amine, tris[3-(2,2-diethoxy-1-aza-2-silacyclopentane)propyl]amine, tetrakis(3-trimethoxysilylpropyl)-1,3-propanediamine, tris(3-trimethoxysilylpropyl)-[3-(2,2-dimethoxy-1-aza-2-silacyclopentane)propyl]-1,3-propanediamine, bis(3-trimethoxysilylpropyl)-bis[3-(2,2-dimethoxy-1-aza-2-silacyclopentane)propyl]-1,3-propanedimane, tris[3-(2,2-dimethoxy-1-aza-2-silacyclopentane)propyl]-(3-trimethoxysilylpropyl)1,3-propanediamine, tetrakis[3-(2,2-dimethoxy-1-aza-2-silacyclopentane)propyl]-1,3-propanediamine, tris(3-trimethoxysilylpropyl)-[3-(1-methoxy-2-trimethylsilyl-1-sila-azacyclopentane)propyl]-1,3-propanediamine, bis(3-trimethoxysilylpropyl)-[3-(2,2-dimethoxy-1-aza-2-silacyclopentane)propyl]-[3-(1-methoxy-2-trimethylsilyl-1-sila-2-azacyclopentane)propyl]-1,3-propanediamine, bis[3-(2,2-dimethoxy-1-aza-2-silacyclopentane)propyl]-(3-trimethoxysilylpropyl)-[3-(1-methoxy-2-trimethylsilyl-1-sila-2-azacyclopentane)propyl]-1,3-propanediamine, tris[3-(2,2-dimethoxy-1-aza-2-silacyclopentane)propyl]-[3-(1-methoxy-2-trimethylsilyl-1-sila-2-azacyclopentane)propyl]-1,3-propanediamine, tetrakis(3-triethoxysilylpropyl)-1,3-propanediamine, tris(3-triethoxysilylpropyl)-[3-(2,2-diethoxy-1-aza-2-silacyclopentane)propyl]-1,3-propanediamine, bis(3-triethoxysilylpropyl)-bis[3-(2,2-diethoxy-1-aza-2-silacyclopentane)propyl]-1,3-propanediamine, tris[3-(2,2-diethoxy-1-aza-2-silacyclopentane)propyl]-(3-triethoxysilylpropyl)-1,3-propanediamine, tetrakis[3-(2,2-diethoxy-1-aza-2-silacyclopentane)propyl]-1,3-propanediamine, tris(3-triethoxysilylpropyl)-[3-(1-ethoxy-2-trimethylsilyl-1-sila-2-azacyclopentane)propyl]-1,3-propanediamine, bis(3-triethoxysilylpropyl)-[3-(2,2-diethoxy-1-aza-2-silacyclopentane)propyl]-[3-(1-ethoxy-2-trimethylsilyl-1-sila-2-azacyclopentane)propyl]-1,3-propanediamine, bis[3-(2,2-diethoxy-1-aza-2-silacyclopentane)propyl]-(3-triethoxysilylpropyl)-[3-(1-ethoxy-2-trimethylsilyl-1-sila-2-azacyclopentane)propyl]-1,3-propanediamine, tris[3-(2,2-diethoxy-1-aza-2-silacyclopentane)propyl]-[3-(1-ethoxy-2-trimethylsilyl-1-sila-2-azacyclopentane)propyl]-1,3-propanediamine, tetrakis(3-trimethoxysilylpropyl)-1,3-bisaminomethylcyclohexane, tris(3-trimethoxysilylpropyl)-[3-(2,2-dimethoxy-1-aza-2-silacyclopentane)proypl]-1,3-bisaminomethycyclohexane, bis(3-trimethoxysilylpropyl)-bis[3-(2,2-dimethoxy-1-aza-2-silacyclopentane)propyl]-1,3-bisaminomethylcyclohexane, tris[3-(2,2-dimethoxy-1-aza-2-silacyclopentane)propyl]-(3-trimethoxysilylpropyl)-1,3-bisaminomethylcyclohexane, tetrakis[3-(2,2-dimethoxy-1-aza-2-silacyclopentane)propyl]-1,3-propanediamine, tris(3-trimethoxysilylpropyl)-[3-(1-methoxy-2-trimethylsilyl-1-sila-2-azacyclopentane)propyl]-1,3-bisaminomethylcyclohexane, bis(3-trimethoxysilylpropyl)-[3-(2,2-dimethoxy-1-aza-2-silacyclopentane)propyl]-[3-(1-methoxy-2-trimethylsilyl-1-sila-2-azacyclopentane)propyl]-1,3-bisaminomethylcyclohexane, bis[3-(2,2-dimethoxy-1-aza-2-silacyclopentane)propyl]-(3-trimethoxysilylpropyl)-[3-(1-methoxy-2-trimethylsilyl-1-sila-2-azacyclopentane)propyl]-1,3-biasminomethylcyclohexane, tris[3-(2,2-dimethoxy-1-aza-2-cyclopentane)propyl]-[3-(1-methoxy-2-trimethylsilyl-1-sila-2-azacyclopentane)propyl]-1,3-bisaminomethylcyclohexane, tetrakis(3-triethoxysilylpropyl)-1,3-propanediamine, tris(3-triethoxysilylpropyl)-[3-(2,2-diethoxy-1-aza-2-silacyclopentane)propyl]-1,3-bisaminomethylcyclohexane, bis(3-trimethoxysilylpropyl)-bis[3-(2,2-diethoxy-1-aza-2-silacyclopentane)propyl]-1,3-bisaminomethylcyclohexane, tris[3-(2,2-diethoxy-1-aza-2-silacyclopentane)propyl]-(3-triethoxysilylpropyl)-1,3-propanediamine, tetrakis[3-(2,2-diethoxy-1-aza-2-silacyclopentane)propyl]-1,3-propanediamine, tris(3-triethoxysilylpropyl)-[3-(1-ethoxy-2-trimethylsilyl-1-sila-2-azacyclopentane)propyl]-1,3-bisaminomethylcyclohexane, bis(3-triethoxysilylpropyl)-[3-(2,2-diethoxy-1-aza-2-silacyclopentane)propyl]-[3-(1-ethoxy-2-trimethylsilyl-1-sila-2-azacyclopentane)propyl]-1,3-bisaminomethylcyclohexane, bis[3-(2,2-diethoxy-1-aza-2-silacyclopentane)propyl]-(3-triethoxysilylpropyl)-[3-(1-ethoxy-2-trimethylsilyl-1-sila-2-azacyclopentane)propyl]-1,3-bisaminomethylcyclohexane, tris[3-(2,2-diethoxy-1-aza-2-silacyclopentane)propyl]-[3-(1-ethoxy-2-trimethylsilyl-1-sila-2-azacyclopentane)propyl]-1,3-bisaminomethylcyclohexane, tetrakis(3-trimethoxysilylpropyl)-1,6-hexamethylenediamine and pentakis(3-trimethoxysilylpropyl)-diethylenetriamine.

Examples of the coupling agent to be used when A in formula (VI) is represented by formula (III) include, but are not limited to, tris(3-trimethoxysilylpropyl)-methyl-1,3-propanediamine, bis(2-trimethoxysilylpropyl)-[3-(2,2-dimethoxy-1-aza-2-silacyclopentane)propyl]-methyl-1,3-propanediamine, bis[3-(2,2-dimethoxy-1-aza-2-silacyclopentane)propyl]-(3-trimethoxysilylpropyl)-methyl-1,3-propanediamine, tris(3-triethoxysilylpropyl)-methyl-1,3-propanediamine, bis(2-triethoxysilylpropyl)-[3-(2,2-diethoxy-1-aza-2-silacyclopentane)propyl]-methyl-1,3-propanediamine, bis[3-(2,2-diethoxy-1-aza-2-silacyclopentane)propyl]-(3-triethoxysilylpropyl)-methyl-1,3-propanediamine, $N^1,N^{1'}$-(propane-1,3-diyl)bis($N^1$-methyl-$N^3,N^3$-bis(3-(trimethoxysilyl)propyl)-1,3-propanediamine) and $N^1$-(3-(bis(3-(trimethoxysilyl)propyl)amino)propyl)-$N^1$-methyl-$N^3$-(3-(methyl-3-(trimethoxysilyl)propyl)amino)propyl)-$N^3$-(3-(trimethoxysilyl)propyl)-1,3-propanediamine.

Examples of the coupling agent to be used when A in formula (VI) is represented by formula (IV) include, but are not limited to, tetrakis[3-(2,2-dimethoxy-1-aza-2-silacyclopentane)propyl]silane, tris[3-(2,2-dimethoxy-1-aza-2-silacyclopentane)propyl]-(3-trimethoxysilylpropyl)silane, tris[3-(2,2-dimethoxy-1-aza-2-silacyclopentane)propyl]-[3-(1-methoxy-2-trimethylsilyl-1-sila-2-azacyclopentane)propyl]silane, bis(3-trimethoxysilylpropyl)-bis[3-(2,2-dimethoxy-1-aza-2-silacyclopentane)propyl]silane, (3-trimethoxysilyl)-[3-(1-methoxy-2-trimethylsilyl-1-sila-2-azacyclopentane)-bis[3-(2,2-dimethoxy-1-aza-2-silacyclopentane)propyl]silane, bis[3-(1-methoxy-2-trimethylsilyl-1-sila-2-azacyclopentane)-bis[3-(2,2-dimethoxy-1-aza-2-silacyclopentane)propyl]silane, tris(3-trimethoxysilylpropyl)-[3-(2,2-dimethoxy-1-aza-2-silacyclopentane)propyl]silane, bis(3-trimethoxysilylpropyl)-[3-(1-methoxy-2-trimethylsilyl-1-sila-2-azacyclopentane)propyl]-[3-(2,2-dimethoxy-1-aza-2-silacyclopentane)propyl]silane, bis[3-(1-methoxy-2-trimethylsilyl-1-sila-2-azacyclopentane)propyl]-bis(3-trimethoxysilylpropyl)silane, and bis(3-trimethoxysilylpropyl)-bis[3-(1-methoxy-2-methyl-1-sila-2-azacyclopentane)propyl]silane.

Examples of the coupling agent to be used when A in formula (VI) is represented by formula (V) include, but are not limited to, 3-tris[2-(2,2-dimethoxy-1-aza-2-silacyclopentane)ethoxy]silyl-1-(2,2-dimethoxy-1-aza-2-silacyclopentane)propane, and 3-tris[2-(2,2-dimethoxy-1-aza-2-silacyclopentane)ethoxy]silyl-1-trimethoxysilylpropane.

In formula (VI), A preferably represents formula (II) or formula (III), and k represents 0 (zero). Thus, there is a tendency that the coupling agent is easily available, and in addition, there is a tendency that more excellent abrasion resistance and low hysteresis loss property can be attained when the modified conjugated diene-based polymer is formed into a vulcanizate.

Examples of such a coupling agent include, but are not limited to, bis(3-trimethoxysilylpropyl)-[3-(2,2-dimethoxy-1-aza-2-silacyclopentane)propyl]amine, tris(3-trimethoxysilylpropyl)amine, tris(3-triethoxysilylpropyl)amine, tris(3-trimethoxysilylpropyl)-[3-(2,2-dimethoxy-1-aza-2-silacyclopentane)propyl]-1,3-propanediamine, tetrakis[3-(2,2-dimethoxy-1-aza-2-silacyclopentane)propyl]-1,3-propanediamine, tetrakis(3-trimethoxysilylpropyl)-1,3-propanediamine, tetrakis(3-triethoxysilylpropyl)-1,3-propanediamine, tetrakis(3-trimethoxysilylpropyl)-1,3-bisaminomethylcyclohexane, tris(3-trimethoxysilylpropyl)-[3-(2,2-dimethoxy-1-aza-2-silacyclopentane)propyl]-1,3-bisaminomethylcyclohexane, tris(3-trimethoxysilylpropyl)-methyl-1,3-propanediamine, and bis[3-(2,2-dimethoxy-1-aza-2-silacyclopentane)propyl]-(3-trismethoxysilylpropyl)-methyl-1,3-propanediamine.

According to one embodiment, it is more preferable, in formula (VI), that A represents formula (II) or formula (III), that k represents 0 (zero), and that a represents an integer of 2 to 10 in formula (II) or formula (III).

In this case, a represents more preferably an integer of 2 to 4.

Thus, the abrasion resistance and the low hysteresis loss property obtained when vulcanized tend to be more excellent.

Examples of such a coupling agent include, but are not limited to, tetrakis[3-(2,2-dimethoxy-1-aza-2-silacyclopentane)propyl]-1,3-propanediamine, tetrakis(3-trimethoxysilylpropyl)-1,3-propanediamine, tetrakis(3-triethoxysilylpropyl)-1,3-propanediamine, tris(3-trimethoxysilylpropyl)-[3-(2,2-dimethoxy-1-aza-2-silacyclopentane)propyl]-1,3-bisaminomethylcyclohexane, tetrakis(3-trimethoxysilylpropyl)-1,3-bisaminomethylcyclohexane, and $N^1$-(3-(bis(3-(trimethoxysilyl)propyl)amino)propyl)-$N^1$-methyl-$N^3$-(3-(methyl(3-(trimethoxysilyl)propyl)amino)propyl)-$N^3$-(3-(trimethoxysilyl)propyl)-1,3-propanediamine.

According to one embodiment, it is more preferable, in formula (VI), that A represents formula (II), that j represents 0 (zero), that k represents 0 (zero), and that a represents an integer of 2 to 4 in formula (II).

Further preferably, in formula (VI), A represents formula (II), j represents 0 (zero), k represents 0 (zero), and a represents 2 in formula (II).

Thus, the abrasion resistance and the low hysteresis loss property obtained when vulcanized tend to be more excellent.

Examples of such a coupling agent include, but are not limited to, tetrakis(3-trimethoxysilylpropyl)-1,3-propanediamine, tetrakis(3-triethoxysilylpropyl)-1,3-propanediamine, and tetrakis(3-trimethoxysilylpropyl)-1,3-bisaminomethylcyclohexane.

In formula (VI), the number of functional groups, ((m−1)×i+p×j+k), of the coupling agent is an integer of 6 to 30, preferably an integer of 6 to 10, and more preferably an integer of 7 to 10.

In the reaction step, the reaction may be caused with a mole number of the functional groups of the coupling agent being 0.8 mol or more and 1.2 mol or less, preferably 0.8 mol or more and 1.0 mol or less, and more preferably 0.8 mol or more and 0.9 mol or less based on a mol of the organomonolithium compound used in the polymerization step. There is a tendency that a part of the organomonolithium compound added in the polymerization step is not involved in the coupling reaction. In other words, the active end of the conjugated diene-based polymer is partly deactivated during the polymerization step or between the polymerization step and the reaction step, and therefore, if the mole number of the functional groups of the coupling agent is 1.0 mol or more per mole of the organomonolithium compound used in the polymerization step, the coupling agent to be added tends to be excessive. When excessive, there is a tendency that the relational expression between Mooney viscosity and the weight average molecular weight (ML≤1.8 (M×$\times 10^{-4}$)−31.5) is not satisfied.

When the amount of the coupling agent to be used is adjusted so that the relationship of the mole number of the functional groups of the coupling agent per mole of the organomonolithium compound used in the polymerization step can fall in the above-described range, the processability obtained when used for obtaining a vulcanizate, the balance between the low hysteresis loss property and the wet skid resistance, and the abrasion resistance obtained when in the form of a vulcanizate tend to be more excellent.

In order to perform the reaction step to attain a desired coupling ratio, the mole number of the functional groups of the coupling agent to be added per mole of the organomonolithium compound is controlled, and if it is excessive, the ratio of polymer having five or less branches, smaller in number than six branches, is increased, and hence, there is a tendency that the relational expression between Mooney viscosity and the weight average molecular weight: (ML≤1.8 (M×$\times 10^{-4}$)−31.5) is difficult to satisfy. Accordingly, the deactivation of the initiator is preferably prevented while setting the amount of the coupling agent to be added to an amount not largely deviated from the coupling ratio. The deviation of the coupling ratio from the amount of the coupling agent to be added is preferably 10% or less, more preferably 8% or less, and further preferably 5% or less. In addition to this, when the modification ratio and the coupling ratio are both 70% by mass or more, the relational expression between Mooney viscosity and the weight average molecular weight: (ML 1.8 (M×$\times 10^{-4}$)−31.5) tends to be easily satisfied.

In the above-described reaction step, in order to satisfy the coupling ratio of the present embodiment, the desired modification ratio, and the above-described relational expression between Mooney viscosity and the weight average molecular weight, it is necessary to accurately control the amount of the coupling agent to be added to fall in the prescribed range for selectively producing a polymer having a specific branch structure. In order to obtain a polymer including a large number of branches, however, it is necessary to use a coupling agent having hexa- or more functional groups, and as the number of functional groups of the coupling agent is larger, the reaction ratio is more difficult to control.

The amount of the coupling agent to be added is controlled so that the mole number of the functional groups of the coupling agent can be 0.8 mol or more and 1.2 mol or less based on a mole of the organomonolithium compound, and it is necessary to employ a method in which further error is not caused in the addition amount. Examples of such a method include a method in which the coupling agent is controlled in the temperature thereof without dilution so as to be added with the viscosity thereof suppressed, and a method in which a monomer before the polymerization, a polymerization solvent and a reactor are subjected to an impurity treatment.

In the former method, as the number of functional groups of the coupling agent is larger, the molecular weight of the coupling agent becomes larger to increase the viscosity, and therefore, the coupling agent unavoidably remains in a tube in adding the coupling agent to a reactor, which tends to cause a deviation between an actual addition amount and a desired addition amount. On the other hand, if the coupling agent is diluted, an impurity such as a water content contained in a diluent solvent is reacted with the coupling agent, which tends to make it difficult to satisfy the coupling ratio of the present embodiment, the desired modification ratio and the relational expression between Mooney viscosity and the weight average molecular weight in the modified conjugated diene-based polymer of the present embodiment. For lowering the viscosity of the coupling agent, the coupling agent is preferably warmed precedently, before the addition, to 40° C. or more and 100° C. or less, preferably 45° C. or more and 90° C. or less, and further preferably 50° C. or more and 80° C. or less.

In the latter method, as a method for performing the impurity treatment of the reactor, for example, an impurity, such as a water content, present in the reactor before the polymerization reaction that can impair the polymerization reaction is neutralized with a polymerization initiator.

Besides, in order that the coupling reaction homogeneously proceeds, it is significant to homogeneously disperse the added coupling agent within the reactor. For example, the reactor has L (the height of the reactor)/D (the inner diameter of the reactor) of preferably 1.5 or more and 6.5 or less, more preferably 2.0 or more and 5.0 or less, and further preferably 2.1 or more and 4.2 or less, and has a stirring speed of 50 rpm or more and 300 rpm or less, more preferably 55 rpm or more and 250 rpm or less, and further preferably 60 rpm or more and 200 rpm or less. When the coupling reaction homogenously proceeds, the relational expression between Mooney viscosity and the weight average molecular weight tends to be easily satisfied.

The modified conjugated diene-based polymer of the present embodiment may be appropriately hydrogenated in the conjugated diene portion thereof.

A method for hydrogenating the conjugated diene portion of the modified conjugated diene-based polymer of the present embodiment is not especially limited, and any of known methods can be employed.

As a suitable hydrogenation method, a method in which the hydrogenation is performed by blowing gaseous hydrogen into the polymer solution in the presence of a catalyst can be employed.

Examples of the catalyst include heterogeneous catalysts such as a catalyst containing a noble metal supported on a porous inorganic substance; and homogenous catalysts such as a catalyst obtained by reacting a solubilized salt of nickel, cobalt or the like with organic aluminum or the like, and a catalyst using metallocene such as titanocene. Among these catalysts, from the viewpoint that a mild hydrogenation condition can be selected, a titanocene catalyst is preferably used. In addition, hydrogenation of an aromatic group can be performed by using a noble metal-supported catalyst.

Specific examples of the hydrogenation catalyst include, but are not limited to, (1) a supported heterogeneous hydrogenation catalyst obtained by supporting a metal such as Ni, Pt, Pd or Ru on carbon, silica, alumina or diatomite, (2) what is called a ziegler catalyst using an organic acid salt of Ni, Co, Fe, Cr or the like, or a transition metal salt such as acetylacetone salt, and a reducing agent such as organic aluminum, and (3) what is called an organic metal complex such as an organic metal compound of Ti, Ru, Rh or Zr. Furthermore, examples of the hydrogenation catalyst include known hydrogenation catalysts described in, for example, Japanese Patent Publication No. 42-8704, Japanese Patent Publication No. 43-6636, Japanese Patent Publication No. 63-4841, Japanese Patent Publication No. 1-37970, Japanese Patent Publication No. 1-53851, Japanese Patent Publication No. 2-9041 and Japanese Patent Laid-Open No. 8-109219. A preferable hydrogenation catalyst is a reaction mixture of a titanocene compound and a reducing organic metal compound.

In the method for producing the modified conjugated diene-based polymer of the present embodiment, a deactivator, a neutralizer or the like may be added if necessary to the resultant copolymer solution after the reaction step.

Examples of the deactivator include, but are not limited to, water; and alcohols such as methanol, ethanol and isopropanol.

Examples of the neutralizer include, but are not limited to, carboxylic acids such as stearic acid, oleic acid and versatic acid (a mixture of highly branched carboxylic acids having 9 to 11 carbon atoms, mainly 10 carbon atoms); and an aqueous solution of an inorganic acid, and a carbon dioxide gas.

To the modified conjugated diene-based polymer of the present embodiment, from the viewpoint of preventing gel formation after the polymerization and of improving stability in the processing, a stabilizer for rubber is preferably added. As the stabilizer for rubber, any of known stabilizers, not limited to the following, can be used, and preferable examples include antioxidants such as 2,6-di-tert-butyl-4-hydroxytoluene (BHT), n-octadecyl-3-(4'-hydroxy-3',5'-di-tert-butylphenol)propionate, and 2-methyl-4,6-bis[(octylthio)methyl]phenol.

In order to further improve the processability of the modified conjugated diene-based polymer of the present embodiment, an extender oil may be added to the modified conjugated diene-based copolymer if necessary.

A preferable example of a method for adding an extender oil to the modified conjugated diene-based polymer includes, but is not limited to, a method in which an extender oil is added to the modified conjugated diene-based polymer solution to be mixed, and the resultant oil-extended copolymer solution is desolvated.

Examples of the extender oil include an aroma oil, a naphthenic oil and a paraffin oil. Among these oils, from the viewpoint of environmental safety, oil bleeding prevention and wet grip characteristics, an aroma-alternative oil containing 3% by mass or less of a polycyclic aromatic (PCA) component according to the IP 346 is preferred. Examples of the aroma-alternative oil include TDAE (Threated Distillate Aromatic Extracts), MES (Mild Extraction Solvate) and the like mentioned in Kautschuk Gummi Kunststoffe 52 (12) 799 (1999), and RAE (Residual Aromatic Extracts).

The amount of the extender oil to be added is not especially limited, and is preferably 1 parts by mass or more and 50 parts by mass or less, and more preferably 2 parts by mass or more and 37.5 parts by mass or less based on 100 parts by mass of the modified conjugated diene-based polymer.

As a method for recovering, from the polymer solution, the modified conjugated diene-based polymer of the present embodiment, any of known methods can be employed.

Examples of the method include, but are not limited to, a method in which the polymer is filtered off after separating the solvent by steam stripping and the resultant is dehydrated and dried to recover the polymer, a method in which the solution is concentrated in a flashing tank and the resultant is devolatilized by a vent extruder or the like, and a method in which the solution is directly devolatilized using a drum dryer or the like.

The modified conjugated diene-based polymer of the present embodiment is suitably used as a vulcanizate. Examples of the vulcanizate include a tire, a hose, a shoe sole, an anti-vibration rubber, a vehicle component and a seismic isolation rubber as well as high-impact polystyrene and a resin reinforcing rubber for an ABS resin or the like. In particular, the modified conjugated diene-based polymer is suitably used as a tread rubber composition for a tire. The vulcanizate can be obtained, for example, by kneading the modified conjugated diene-based polymer of the present embodiment and, if necessary, an inorganic filler such as a silica-based inorganic filler or carbon black, a rubber-like polymer different from the modified conjugated diene-based polymer of the present embodiment, a silane coupling agent, a rubber softener, a vulcanizing agent, a vulcanization accelerator, a vulcanization aid or the like to obtain a modified conjugated diene-based polymer composition, and vulcanizing the thus obtained composition by heating.

[Rubber Composition]

A rubber composition of the present embodiment contains a rubber component and a silica-based filler in an amount of 5.0 parts by mass or more and 150 parts by mass or less based on 100 parts by mass of the rubber component.

The rubber component contains the above-described modified conjugated diene-based polymer of the present embodiment in an amount of 10% by mass or more based on 100% by mass of the rubber component.

If a silica-based filler is dispersed in the rubber composition, the rubber composition tends to be more excellent in the processability obtained when used for obtaining a vulcanizate and tends to be more excellent in the balance between the low hysteresis loss property and the wet skid resistance, and the abrasion resistance obtained when in the form of a vulcanizate.

Also when the rubber composition of the present embodiment is to be used for a vulcanized rubber for a tire, a vehicle component such as an anti-vibration rubber, shoes or the like, a silica-based filler is preferably contained.

In the rubber composition, a rubber-like polymer different from the modified conjugated diene-based polymer of the present embodiment (hereinafter simply referred to as the "rubber-like polymer") can be used in combination with the modified conjugated diene-based polymer of the present embodiment.

Examples of such a rubber-like polymer include, but are not limited to, a conjugated diene-based polymer or a hydrogenated product thereof, a random copolymer of a conjugated diene-based compound and a vinyl aromatic compound or a hydrogenated product thereof, a block copolymer of a conjugated diene-based compound and a vinyl aromatic compound or a hydrogenated product thereof, a non-diene-based polymer and a natural rubber.

Specific examples of the rubber-like polymer include, but are not limited to, a butadiene rubber or a hydrogenated product thereof, an isoprene rubber or a hydrogenated product thereof, styrene-based elastomers such as a styrene-butadiene rubber or a hydrogenated product thereof, a styrene-butadiene block copolymer or a hydrogenated product thereof, and a styrene-isoprene block copolymer or a hydrogenated product thereof, and an acrylonitrile-butadiene rubber or a hydrogenated product thereof.

Examples of the non-diene-based polymer include, but are not limited to, olefin-based elastomers such as an ethylene-propylene rubber, an ethylene-propylene-diene rubber, an ethylene-butene-diene rubber, an ethylene-butene rubber, an ethylene-hexene rubber and an ethylene-octene rubber, a butyl rubber, a brominated butyl rubber, an acrylic rubber, a fluorine rubber, a silicone rubber, a chlorinated polyethylene rubber, an epichlorohydrin rubber, an α,β-unsaturated nitrile-acrylic acid ester-conjugated diene copolymer rubber, a urethane rubber and a polysulfide rubber.

Examples of the natural rubber include, but are not limited to, smoked sheets of RSS Nos. 3 to 5, SMR and epoxidized natural rubber.

The above-described various rubber-like polymers may be in the form of a modified rubber imparted with a functional group having polarity such as a hydroxyl group or an amino group. For use in a tire, a butadiene rubber, an isoprene rubber, a styrene-butadiene rubber, a natural rubber and a butyl rubber are preferably used.

The weight average molecular weight of the rubber-like polymer is, from the viewpoint of balance between the performance and the processing characteristics, preferably 2,000 or more and 2,000,000 or less, and more preferably 5,000 or more and 1,500,000 or less. Besides, a rubber-like polymer having a low molecular weight, namely, what is called a liquid rubber, can be used. One of these rubber-like polymers may be singly used, or two or more of these may be used together.

When the rubber composition contains the modified conjugated diene-based polymer of the present embodiment and the rubber-like polymer, a content (in a mass ratio) of the modified conjugated diene-based polymer to the rubber-like polymer is, in terms of (the modified conjugated diene-based polymer/the rubber-like polymer), preferably 10/90 or more and 100/0 or less, more preferably 20/80 or more and 90/10 or less, and further preferably 50/50 or more and 80/20 or less.

Accordingly, the rubber component contains, based on the total amount (100 parts by mass) of the rubber component, the modified conjugated diene-based polymer of the present embodiment in an amount of preferably 10 parts by mass or more and 100 parts by mass or less, more preferably 20 parts by mass or more and 90 parts by mass or less, and further preferably 50 parts by mass or more and 80 parts by mass or less.

If the content ratio of (the modified conjugated diene-based polymer/the rubber-like polymer) falls in the above-described range, when in the form of a vulcanizate, the balance between the low hysteresis loss property and the wet skid resistance is excellent, and the abrasion resistance is excellent.

A content of the silica-based filler in the rubber composition is 5.0 parts by mass or more and 150 parts by mass or less, preferably 20 parts by mass or more and 100 parts by mass or less, and further preferably 25 parts by mass or more and 60 parts by mass or less based on 100 parts by mass of the rubber component containing the modified conjugated diene-based polymer.

From the viewpoint of exhibiting the effect of the filler addition, the content of the silica-based filler is 5.0 parts by mass or more, and from the viewpoint that the filler is sufficiently dispersed to attain practically sufficient processability and mechanical strength of the composition, the content is 150 parts by mass or less.

The silica-based inorganic filler is not especially limited, any of known fillers can be used, a solid particle containing $SiO_2$ or $Si_3Al$ as a constituent unit is preferred, and a solid particle containing $SiO_2$ or $Si_3Al$ as a principal component of a constituent unit is more preferred. Here, the principal component refers to a component contained in the silica-based inorganic filler in an amount of 50% by mass or more, preferably 70% by mass or more, and more preferably 80% by mass or more.

Specific examples of the silica-based inorganic filler include, but are not limited to, silica, clay, talc, mica, diatomite, wollastonite, montmorillonite, zeolite and inorganic fibrous substances such as glass fiber.

Besides, examples include a silica-based inorganic filler having a hydrophobized surface, and a mixture of a silica-based inorganic filler and an inorganic filler excluding silica.

Among these, from the viewpoint of the strength and the abrasion resistance, silica and glass fiber are preferred, and silica is more preferred. Examples of the silica include dry silica, wet silica and synthetic silicate silica. Among these silica, wet silica is preferred from the viewpoint that it is excellent in the balance in the wet skid resistance.

From the viewpoint of obtaining practically good abrasion resistance of the rubber composition of the present embodiment, a nitrogen adsorption specific surface area, obtained by the BET adsorption method, of the silica-based inorganic filler is preferably 100 $m^2/g$ or more and 300 $m^2/g$ or less, and more preferably 170 $m^2/g$ or more and 250 $m^2/g$ or less. Besides, a silica-based inorganic filler having a comparatively small specific surface area (for example, a specific surface area of 200 $m^2/g$ or less) and a silica-based inorganic filler having a comparatively large specific surface area (for example, a specific surface area of 200 $m^2/g$ or more) can be used in combination if necessary.

In the present embodiment, if a silica-based inorganic filler having a comparatively large specific surface area (of, for example, 200 $m^2/g$ or more) is used in particular, the modified conjugated diene-based polymer tends to be improved in the dispersibility of silica, and improved particularly in the abrasion resistance and the low hysteresis loss property.

The rubber composition of the present embodiment may contain an additional filler in addition to the silica-based filler.

Examples of the additional filler include, but are not limited to, carbon black, metal oxides and metal hydroxides. Among these, carbon black is preferred. One of such fillers may be singly used, or two or more of these may be used together.

Examples of the carbon black include, but are not limited to, carbon blacks of SRF, FEF, HAF, ISAF and SAF classes. Among these, a carbon black having a nitrogen adsorption specific surface area of 50 $m^2/g$ or more and dibutyl phthalate (DBP) oil absorption of 80 mL/100 g or less is preferred.

A content of the carbon black is preferably 0.5 parts by mass or more and 100 parts by mass or less, more preferably 3.0 parts by mass or more and 100 parts by mass or less, and further preferably 5.0 parts by mass or more and 50 parts by mass or less based on 100 parts by mass of the rubber component containing the modified conjugated diene-based polymer. From the viewpoint of exhibiting performances required in use as a tire or the like such as dry grip performance and conductivity, the content of the carbon black is preferably 0.5 parts by mass or more, and from the viewpoint of dispersibility, the content is preferably 100 parts by mass or less.

The metal oxide refers to a solid particle containing a principal component of a constituent unit represented by MxOy (wherein M represents a metal atom, and x and y each independently represent an integer of 1 to 6). Examples of the metal oxide include, but are not limited to, alumina, titanium oxide, magnesium oxide and zinc oxide. Examples of the metal hydroxide include, but are not limited to, aluminum hydroxide, magnesium hydroxide and zirconium hydroxide.

The rubber composition may contain a silane coupling agent.

The silane coupling agent is preferably a compound that has a function to make close the interaction between the rubber component and the inorganic filler, has a group having affinity with or a binding property to both of the rubber component and the silica-based inorganic filler, and contains, in one molecule, a sulfur bond portion and an alkoxysilyl group or silanol group portion. Examples of such a compound include bis-[3-(triethoxysilyl)-propyl]-tetrasulfide, bis-[3-(triethoxysilyl)-propyl]-disulfide and bis-[2-(triethoxysilyl)-ethyl]-tetrasulfide.

A content of the silane coupling agent is preferably 0.1 parts by mass or more and 30 parts by mass or less, more preferably 0.5 parts by mass or more and 20 parts by mass or less, and further preferably 1.0 part by mass or more and 15 parts by mass or less based on 100 parts by mass of the inorganic filler. If the content of the silane coupling agent falls in the aforementioned range, there is a tendency that the effect of the addition of the silane coupling agent can be more conspicuous.

The rubber composition of the present embodiment may contain a rubber softener from the viewpoint of improvement of the processability.

As the rubber softener, a mineral oil or a liquid or low molecular weight synthetic softer is suitably used.

A mineral oil-based rubber softener, which is used for softening, expanding and improving processability of a rubber and is designated as a process oil or an extender oil, is a mixture of an aromatic ring, a naphthene ring and a paraffin chain, and one in which the number of carbon atoms of the paraffin chain is 50% or more of the number of all carbon atoms is designated as a paraffin-based softener, one in which the number of carbon atoms of the naphthene ring is 30% or more and 45% or less of the number of all carbon atoms is designated as a naphthene-based softener, and one in which the number of aromatic carbon atoms exceeds 30% of the number of all carbon atoms is designated as an aromatic-based softener.

If the modified conjugated diene-based polymer of the present embodiment is a modified product of a copolymer of a conjugated diene compound and a vinyl aromatic compound, a rubber softener to be used is preferably one having an appropriate aromatic content because such a softener tends to fit with the copolymer.

A content of the rubber softener in the rubber composition of the present embodiment is preferably 0 part by mass or more and 100 parts by mass or less, more preferably 5 parts by mass or more and 60 parts by mass or less, and further preferably 5 parts by mass or more and 30 parts by mass or less based on 100 parts by mass of the rubber component containing the modified conjugated diene-based polymer.

If the content of the rubber softener is 100 parts by mass or less based on 100 parts by mass of the rubber component, there is a tendency that the bleeding out is suppressed and the stickiness of the surface of the rubber composition is suppressed.

The rubber composition of the present embodiment is obtained by mixing the modified conjugated diene-based polymer, the silica-based inorganic filler, and, if necessary, another rubber-like polymer, carbon black or another additional filler, a silane coupling agent and an additive such as a rubber softener.

Examples of a method for mixing the modified conjugated diene-based polymer and another rubber-like polymer, a silica-based inorganic filler, carbon black or another filler, a silane coupling agent, and an additive such as a rubber softener include, but are not limited to, a melt-kneading method using a general mixer such as an open roll, a banbury mixer, a kneader, a single shaft screw extruder, a twin shaft screw extruder or a multi-shaft screw extruder, and a method in which the respective components are melted and mixed followed by removal of a solvent by heating.

Among these methods, the melt-kneading method using a roll, a banbury mixer, a kneader or an extruder is preferred from the viewpoint of productivity and high kneadability.

Besides, either of a method in which the rubber component and another filler, a silane coupling agent and an additive are kneaded all together or a method in which the components are mixed dividedly in plural times is applicable.

The rubber composition of the present embodiment may be a vulcanized composition having been vulcanized with a vulcanizing agent.

Examples of the vulcanizing agent include, but are not limited to, radical generators such as organic peroxides and azo compounds, oxime compounds, nitroso compounds, polyamine compounds, sulfur and sulfur compounds.

The sulfur compounds include sulfur monochloride, sulfur dichloride, disulfide compounds and high molecular weight polysulfide compounds.

A content of the vulcanizing agent is preferably 0.01 parts by mass or more and 20 parts by mass or less, and more preferably 0.1 parts by mass or more and 15 parts by mass or less based on 100 parts by mass of the rubber component. As a vulcanizing method, any of known methods is applicable, and a vulcanization temperature is preferably 120° C. or more and 200° C. or less, and more preferably 140° C. or more and 180° C. or less.

For the vulcanization, a vulcanization accelerator or a vulcanization aid may be used if necessary.

As the vulcanization accelerator, any of known materials can be used, and examples include, but are not limited to, sulphenamide-based, guanidine-based, thiuram-based, aldehyde-amine-based, aldehyde-ammonia-based, thiazole-based, thiourea-based and dithiocarbamate-based vulcanization accelerators.

Besides, examples of a vulcanization aid include, but are not limited to, zinc oxide and stearic acid. A content of the vulcanization accelerator is preferably 0.01 parts by mass or more and 20 parts by mass or less, and more preferably 0.1 parts by mass or more and 15 parts by mass or less based on 100 parts by mass of the rubber component.

The rubber composition of the present embodiment may contain, as long as the object of the present invention is not impaired, various additives such as other softener and filler excluding those described above, a heat resistance stabilizer, an antistatic agent, a weathering stabilizer, an anti-ageing agent, a colorant and a lubricant. As another softener, any of known softeners can be used. Specific examples of another filler include calcium carbonate, magnesium carbonate, aluminum sulfate and barium sulfate. As each of the heat resistance stabilizer, the antistatic agent, the weathering stabilizer, the anti-ageing agent, the colorant and the lubricant, any of known materials can be used.

The rubber composition of the present embodiment is suitably used as a rubber composition for a tire. The rubber composition for a tire of the present embodiment is applicable to, but not limited to, various tires such as a fuel-efficient tire, an all-season tire, a high-performance tire and a studless tire; and various tire portions such as a tread, a carcass, a sidewall and a bead. In particular, since the rubber composition for a tire is excellent in the balance between the low hysteresis loss property and the wet skid resistance obtained when in the form of a vulcanizate and in the abrasion resistance, it is more suitably used as a tread of a fuel-efficient tire or a high-performance tire.

[Tire]

A tire of the present embodiment contains the rubber composition of the present embodiment.

The tire of the present embodiment may be, but is not limited to, various tires such as a fuel-efficient tire, an all-season tire, a high-performance tire and a studless tire. Alternatively, the tire may be one using the rubber composition of the present embodiment in at least one of tire portions selected from the group consisting of a tread, a carcass, a sidewall and a bead.

In particular, since the tire of the present embodiment is excellent in the balance between the low hysteresis loss property and the wet skid resistance and in the abrasion resistance, it is suitably used as a fuel-efficient tire or a high-performance tire.

EXAMPLES

The present embodiment will now be described in more detail with reference to specific examples and comparative examples, and it is noted that the present embodiment is not limited to the following examples at all.

Analyses of polymers of Examples 1 to 5 and Comparative Examples 1 to 4 were performed by the following methods.

(1) Amount of Bound Styrene

One hundred (100) mg of a sample was dissolved in chloroform to be diluted to 100 mL, and the resultant was used as a measurement sample.

Based on the absorption of a phenyl group of styrene at UV 254 nm, the amount of bound styrene (% by mass) was measured (spectrophotometer "UV-2450" manufactured by Shimadzu Corporation).

(2) Microstructure of Butadiene Portion (Amount of 1,2-Vinyl Bond)

Fifty (50) mg of a sample was dissolved in 10 mL of carbon disulfide, and the resultant was used as a measurement sample.

A solution cell was used to measure an infrared spectrum in a range of 600 to 1000 $cm^{-1}$, and in accordance with a calculation formula of the Hampton method based on absorbance at a prescribed wavelength, a microstructure of a butadiene portion was obtained (Fourier transform infrared spectrophotometer "FT-IR230" manufactured by JASCO Corporation).

(3) Mooney Viscosity $ML_{1+4}$ (100° C.) measured at 100° C.

Mooney viscosity was measured using Mooney viscometer ("VR1132" manufactured by Ueshima Seisakusho Co., Ltd.) in accordance with JIS K6300 (ISO289-1) and ISO289-4. A measurement temperature was set to 100° C. First, a sample was preheated for 1 minute, a rotor was rotated at 2 rpm, and a torque measured 4 minutes after was defined as Mooney viscosity ($ML_{1+4}$ (100° C.)).

(4) Glass Transition Temperature (Tg)

A DSC curve was recorded in accordance with ISO 22768:2006 using a differential scanning calorimeter "DSC3200S" manufactured by MAC Science Co., Ltd. under a flow of helium at 50 mL/min during temperature increase from −100° C. at a rate of 20° C./min, and a peak top (an inflection point) of the thus obtained DSC differential curve was defined as a glass transition temperature.

(5) Coupling Ratio and Molecular Weight

A chromatogram was measured using a GPC measurement apparatus including a series of three columns using a polystyrene-based gel as a filler, and on the basis of a calibration curve obtained using standard polystyrene, a coupling ratio, a weight average molecular weight (Mw), a number average molecular weight (Mn) and peak top molecular weights ($Mp_1$ and $Mp_2$) were obtained.

It was noted that $Mp_1$ corresponded to the peak top molecular weight of the coupling polymer of the modified conjugated diene-based polymer, and when the coupling polymer had a plurality of peaks, the peak top molecular weight of the highest peak was defined as $Mp_1$.

On the other hand, $Mp_2$ corresponded to the peak top molecular weight of a non-coupling polymer of a conjugated diene-based polymer chain (i.e., the peak of the lowest molecular weight).

As an eluent, tetrahydrofuran (THF) was used. As the columns, a guard column: TSKguardcolumn Super H-H manufactured by Tosoh Corporation, and columns: TSKgel SuperH5000, TSKgel SuperH6000 and TSKgel SuperH7000 manufactured by Tosoh Corporation were used. An RI detector ("HLC8020" manufactured by Tosoh Corporation) was used under conditions of an oven temperature of 40° C. and a THF flow rate of 1.0 mL/min. Ten (10) mg of a sample for the measurement was dissolved in 20 mL of THF to obtain a measurement solution, and 200 μL of the measurement solution was injected into GPC measurement apparatus for performing the measurement.

(6) Modification Ratio

Measurement was performed by applying a characteristic that a modified component adsorbs to a GPC column using a silica-based gel as a filler. Specifically, a chromatogram obtained by measurement using a polystyrene-based gel column and a chromatogram obtained by measurement using a silica-based column were obtained by using a sample solution containing a sample and low molecular weight internal standard polystyrene, and based on a difference between these chromatograms, an adsorption amount in the silica column was measured to obtain a modification ratio.

Preparation of Sample Solution:

Ten (10) mg of a sample and 5 mg of standard polystyrene were dissolved in 20 mL of THF to obtain a sample solution.

GPC Measurement Conditions using Polystyrene-based Column:

THF was used as the eluent, and 20 μL of the sample solution was injected into the apparatus for measurement. As the columns, a guard column: TSKguardcolumn SuperH-H, and columns: TSKgel SuperH5000, TSKgel SuperH6000 and TSKgel SuperH7000 manufactured by Tosoh Corporation were used. An RI detector (HLC-8020 manufactured by Tosoh Corporation) was used under conditions of a column oven temperature of 40° C. and a THF flow rate of 1.0 mL/min to obtain a chromatogram.

GPC Measurement Conditions using Silica-based Column:

THF was used as the eluent, and 50 μL of the sample solution was injected into the apparatus for measurement. As the columns, a guard column: DIOL 4.6×12.5 mm 5 micron, and columns: Zorbax PSM-1000S, PSM-300S and PSM-60S were used. An RI detector was used for measurement under conditions of a column oven temperature of 40° C. and a THF flow rate of 0.5 mL/min in CCP8020 series build-up GPC system: AS-8020, SD-8022, CCPS, CO-8020, RI-8021 manufactured by Tosoh Corporation to obtain a chromatogram.

Calculation Method for Modification Ratio:

Assuming that the whole peak area in the chromatogram obtained using the polystyrene-based column was 100, values of a peak area P1 of the sample and a peak area P2 of standard polystyrene were calculated. Besides, assuming that the whole peak area of the chromatogram obtained using the silica-based column was 100, values of a peak area P3 of the sample and a peak area P4 of standard polystyrene were calculated. By using these values, a modification ratio (%) was obtained in accordance with the following expression:

$$\text{Modification Ratio (\%)} = [1 - (P2 \times P3)/(P1 \times P4)] \times 100$$

wherein P1+P2=P3+P4=100.

(7) Presence of Nitrogen Atom

The measurement was performed similarly to that described in (6), and if the calculated modification ratio was 10% or more, it was determined that the sample had a nitrogen atom. Thus, it was confirmed that each of the modified conjugated diene-based polymers of Examples 1 to 5 and Comparative Examples 2 to 4 had a nitrogen atom, and that the modified conjugated diene-based polymer of Comparative Example 1 did not have a nitrogen atom.

(8) Presence of Silicon Atom

Measurement was performed by using 0.5 g of a modified conjugated diene-based polymer as a sample and using a ultraviolet visible spectrophotometer (trade name "UV-1800" manufactured by Shimadzu Corporation) in accordance with JIS K 0101 44.3.1, and quantitative determination was performed by a molybdenum blue-spectrophotometric method. As a result, if a silicon atom was detected (low detection limit: 10 mass ppm), it was determined that the sample had a silicon atom. Thus, it was confirmed that each of the modified conjugated diene-based polymers of Examples 1 to 5 and Comparative Examples 1 to 4 had a silicon atom.

Example 1

A temperature-controllable autoclave having an internal volume of 5 L (L/D: 3.4) and equipped with a stirrer and a jacket was used as a reactor, and 1995 g of normal hexane and n-butyllithium, which was used for neutralizing an impurity present in the reactor and possibly impairing a polymerization reaction, were put in the reactor, the resultant was stirred at 70° C. for 5 minutes, and then cooled to room temperature to extract a solution, and the reactor was emptied. Next, 1670 g of normal hexane, 83 g of styrene, 236 g of 1,3-butadiene, and 2.73 mmol of 2,2-bis(2-oxolanyl) propane used as a polar substance, from all of which impurities had been precedently removed, were put in the reactor, and 2.92 mmol of n-butyllithium (which is shown as "NBL" in a table below) was added as a polymerization initiator when the temperature within the reactor was 56° C., and thus, the polymerization was started.

Immediately after starting the polymerization, the temperature within the reactor increased, and reached a peak temperature, which was 79° C. When the temperature was found to lower, 0.41 mmol of tris(3-trimethoxysilylpropyl)amine (abbreviated as "a" in the table below) adjusted to 50° C. was added thereto as a coupling agent, and the resultant was stirred for 10 minutes. Here, the stirring speed was 200 rpm. It was 2 minutes after reaching the peak temperature that the coupling agent was added.

The reaction was stopped by adding 2.92 mmol of ethanol as a polymerization terminator, and thus, a modified conjugated diene-based polymer-containing polymer solution was obtained.

To the thus obtained polymerization solution, 0.64 g of 2,6-di-tert-butyl-4-hydroxytoluene was added as an antioxidant, the solvent was removed by steam stripping, and a modified conjugated diene-based copolymer A was obtained after vacuum drying.

Analysis results of the modified conjugated diene-based copolymer A are shown in Table 1.

Besides, a schematic diagram of a molecular weight distribution curve obtained by GPC using a polystyrene-based column is illustrated in FIG. 2.

In FIG. 2, a reference sign 1 denotes a coupling polymer peak, and a reference sign 2 denotes a non-coupling polymer peak.

Example 2

The coupling agent was changed from tris(3-trimethoxysilylpropyl)amine to tris(3-triethoxysilylpropyl)amine (abbreviated as "b" in the table).

The reaction starting temperature was 55° C., and the reaction peak temperature was 77° C.

A modified conjugated diene-based polymer B was obtained in the same manner as in Example 1 except for these.

Analysis results of the modified conjugated diene-based copolymer B are shown in Table 1.

Example 3

The amount of the polymerization initiator to be added was changed from 2.92 mmol to 3.59 mmol.

The coupling agent was changed from tris(3-trimethoxysilylpropyl)amine to tetrakis(3-trimethoxysilylpropyl)-1,3-propanediamine (abbreviated as "c" in the table), and the amount to be added was changed from 0.41 mmol to 0.38 mmol.

The reaction starting temperature was 50° C. and the reaction peak temperature was 81° C.

Besides, the amount of the polar substance to be added was changed to 3.50 mmol.

A modified conjugated diene-based polymer C was obtained in the same manner as in Example 1 except for these. Analysis results of the modified conjugated diene-based copolymer C are shown in Table 1.

Example 4

The amount of the polymerization initiator to be added was changed from 2.92 mmol to 3.59 mmol.

The coupling agent was changed from tris(3-trimethoxysilylpropyl)amine to tetrakis(3-trimethoxysilylpropyl)-1,3-bisaminomethylcyclohexane (abbreviated as "d" in the table), and the amount to be added was changed from 0.41 mmol to 0.38 mmol.

The reaction starting temperature was 50° C. and the reaction peak temperature was 82° C.

Besides, the amount of the polar substance to be added was changed to 3.50 mmol.

A modified conjugated diene-based polymer D was obtained in the same manner as in Example 1 except for these.

Analysis results of the modified conjugated diene-based copolymer D are shown in Table 1.

Example 5

The polymerization initiator was changed to a cyclohexane solution of hexamethylene imino lithium precedently reacted with 2.92 mmol of hexamethylene imine and 2.92 mmol of n-butyllithium (described as "HMI+NBL" in the table), and the coupling agent was changed from tris(3-trimethoxysilylpropyl)amine to 1,2-bis(trichlorosilyl)ethane (abbreviated as "e" in the table).

The reaction starting temperature was 55° C. and the reaction peak temperature was 77° C.

A modified conjugated diene-based polymer E was obtained in the same manner as in Example 1 except for these.

Analysis results of the modified conjugated diene-based copolymer E are shown in Table 1.

Comparative Example 1

A temperature-controllable autoclave having an internal volume of 5 L and equipped with a stirrer and a jacket was used as a reactor, and 1670 g of normal hexane, 83 g of styrene, 236 g of 1,3-butadiene, and 1.91 mmol of 2,2-bis(2-oxolanyl)propane used as a polar substance, from all of which impurities had been precedently removed, were put in the reactor, and 2.55 mmol of a polymerization initiator, n-butyllithium, was added thereto when the temperature within the reactor was 58° C., and thus, the polymerization was started.

Immediately after starting the polymerization, the temperature within the reactor increased, and when the temperature was found to lower after reaching a peak temperature, 0.56 mmol of bis(trimethoxysilyl)ethane (abbreviated as "f" in the table below) was added thereto as a coupling agent, and the resultant was stirred for 10 minutes. The reaction was stopped by adding 2.55 mmol of ethanol as a polymerization terminator, and thus, a modified conjugated diene-based polymer-containing polymer solution was obtained.

To the thus obtained polymerization solution, 0.64 g of 2,6-di-tert-butyl-4-hydroxytoluene was added as a stabilizer, the solvent was removed by steam stripping, and a modified conjugated diene-based copolymer F was obtained after vacuum drying.

Analysis results of the modified conjugated diene-based copolymer F are shown in Table 1.

Comparative Example 2

The coupling agent was changed from bis(trimethoxysilyl)ethane to bis(3-trimethoxysilylpropyl)-N-methylamine (abbreviated as "g" in the table).

The reaction starting temperature was 56° C. and the reaction peak temperature was 82° C.

A modified conjugated diene-based polymer G was obtained in the same manner as in Example 1 except for these.

Analysis results of the modified conjugated diene-based copolymer G are shown in Table 1.

Comparative Example 3

The amount of the coupling agent to be added was changed from 0.41 mmol to 0.28 mmol.

The reaction starting temperature was 55° C. and the reaction peak temperature was 78° C.

A modified conjugated diene-based polymer H was obtained in the same manner as in Example 1 except for these.

Analysis results of the modified conjugated diene-based polymer H are shown in Table 1.

Comparative Example 4

The amount of the coupling agent to be added was changed from 0.41 mmol to 0.72 mmol.

The reaction starting temperature was 54° C. and the reaction peak temperature was 75° C. A modified conjugated diene-based polymer I was obtained in the same manner as in Example 1 except for these. Analysis results of the modified conjugated diene-based polymer I are shown in Table 1.

Besides, a schematic diagram of a molecular weight distribution curve obtained by GPC using a polystyrene-based column is illustrated in FIG. 4.

In FIG. 4, a reference sign 1 denotes a coupling polymer peak, and a reference sign 2 denotes a non-coupling polymer peak.

TABLE 1

|  |  |  | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|---|
| Modified Conjugated Diene-based Polymer (Sample No.) |  |  | A | B | C | D | E | F | G | H | I |
| Polymerization Conditions |  |  |  |  |  |  |  |  |  |  |  |
| Butadiene |  | (g) | 236 | 236 | 236 | 236 | 236 | 236 | 236 | 236 | 236 |
| Styrene |  | (g) | 83 | 83 | 83 | 83 | 83 | 83 | 83 | 83 | 83 |
| Normal Hexane |  | (g) | 1670 | 1670 | 1670 | 1670 | 1670 | 1670 | 1670 | 1670 | 1670 |
| Polymerization Starting Temperature |  | (° C.) | 56 | 55 | 50 | 50 | 55 | 58 | 56 | 55 | 54 |
| Polymerization Peak Temperature |  | (° C.) | 79 | 77 | 81 | 82 | 77 | 73 | 82 | 78 | 75 |
| Polymerization Initiator | Type*[1] |  | NBL | NBL | NBL | NBL | HMI + NBL | NBL | NBL | NBL | NBL |
|  | Addition Amount | (mmol) | 2.92 | 2.92 | 3.59 | 3.59 | 2.92 | 2.55 | 2.55 | 2.92 | 2.92 |
| Polar Substance*[2] | Addition Amount | (mmol) | 2.73 | 2.73 | 3.50 | 3.50 | 2.73 | 1.91 | 1.91 | 2.73 | 2.73 |
| Modification Agent | Type*[3] |  | a | b | c | d | e | f | g | a | a |
|  | Addition Amount | (mmol) | 0.41 | 0.41 | 0.38 | 0.38 | 0.41 | 0.56 | 0.56 | 0.28 | 0.72 |
|  | Lithium Equivalent Ratio*[4] |  | 0.84 | 0.84 | 0.85 | 0.85 | 0.84 | 0.88 | 0.88 | 0.58 | 1.48 |
| Analysis Values |  |  |  |  |  |  |  |  |  |  |  |
| Mooney Viscosity $ML_{1+4}$ (100° C.) of Modified Conjugated Diene-based Polymer |  |  | 63 | 60 | 62 | 65 | 62 | 63 | 64 | 49 | 58 |
| Weight Average Molecular Weight (Mw) |  | (×10$^{-4}$) | 54.5 | 52.4 | 60.1 | 63.5 | 52.1 | 45.1 | 46.0 | 51.2 | 48.3 |
| Number Average Molecular Weight (Mn) |  | (×10$^{-4}$) | 42.6 | 39.8 | 40.9 | 44.9 | 38.5 | 37.5 | 37.4 | 31.5 | 35.5 |
| Mw/Mn |  |  | 1.28 | 1.32 | 1.47 | 1.45 | 1.31 | 1.20 | 1.23 | 1.63 | 1.36 |
| $Mp_1/Mp_2$ |  |  | 3.56 | 3.48 | 4.38 | 4.41 | 3.60 | 3.03 | 2.95 | 3.75 | 2.59 |
| Coupling Ratio |  | (%) | 81.8 | 80.2 | 83.4 | 85.2 | 87.3 | 87.2 | 85.2 | 57.7 | 80.9 |
| Modification Ratio |  | (%) | 81.6 | 80.2 | 83.0 | 84.5 | 95.7 | 0 | 84.8 | 57.5 | 80.5 |
| 1.8(Mw × 10$^{-4}$) − 31.5 |  |  | 66.6 | 62.8 | 76.7 | 82.8 | 62.3 | 49.7 | 51.3 | 60.7 | 55.4 |
| Amount of Bound Styrene |  | (mass %) | 27 | 27 | 27 | 26 | 26 | 26 | 27 | 26 | 26 |
| Amount of Bound Vinyl (Amount of 1,2-bond) |  | (mol %) | 55 | 56 | 55 | 55 | 55 | 57 | 54 | 56 | 57 |
| Glass Transition Temperature (Tg) |  | (° C.) | −26 | −26 | −26 | −26 | −26 | −25 | −27 | −26 | −25 |

Signs used in Table 1 have the following meanings:
*[1]NBL: normal butyllithium HMI: hexamethylene imine
*[2]2,2-bis(2-oxolanyl)propane used
*[3]a: tris(3-trimethoxysilylpropyl)amine: (hexafunctional)
b: tris(3-triethoxysilylpropyl)amine (hexafunctional)
c: tetrakis(3-trimethoxysilylpropyl)-1,3-propanediamine: (octafunctional)
d: tetrakis(3-trimethoxysilylpropyl)-1,3-bisaminomethylcyclohexane (octafunctional)
e: 1,2-bis(trichlorosilyl)ethane: (hexafunctional)
f: bis(trimethoxysilyl)ethane: (tetrafunctional)
g: bis(3-trimethoxysilylpropyl)-N-methylamine: (tetrafunctional)
*[4]Assuming that a trialkoxysilyl group is di-functional, a dialkoxysilyl group is mono-functional, a monoalkoxysilyl group is zero-functional, a halogenated silyl group has functional groups in the same number as that of halogens, and an aza-silyl group is mono-functional, the number of functional groups of the coupling agent was calculated, and a value obtained by dividing the number of functional groups by a mole number of the polymerization initiator was shown as a lithium equivalent ratio.

Besides, a schematic diagram of a molecular weight distribution curve obtained by GPC using a polystyrene-based column is illustrated in FIG. 3.

In FIG. 3, a reference sign 1 denotes a coupling polymer peak, and a reference sign 2 denotes a non-coupling polymer peak.

[Examples 6 to 10] [Comparative Examples 5 to 8]

The modified conjugated diene-based polymers obtained in Examples 1 to 5 and Comparative Examples 1 to 4 (samples A to I) were used as starting material rubbers, and rubber compositions respectively containing the starting material rubbers were obtained in accordance with the following compositions:

Modified conjugated diene-based polymer (any of the samples A to I): 100 parts by mass Silica ("Ultrasil 7000 GR" manufactured by Evonik Degussa Gmbh, nitrogen adsorption specific surface area: 170 m$^2$/g): 75.0 parts by mass Carbon black ("SEAST KH (N339)" manufactured by Tokai Carbon Co., Ltd.): 5.0 parts by mass Silane coupling agent ("Si75" manufactured by Evonik Degussa Gmbh, bis(triethoxysilylpropyl)disulfide): 6.0 parts by mass S-RAE oil ("Process NC140" manufactured by JX Nippon Mining & Metals Corporation): 30.0 parts by mass Zinc oxide: 2.5 parts by mass Stearic acid: 2.0 part by mass Antioxidant (N-(1,3-dimethylbutyl)-N'-phenyl-p-phenylenediamine): 2.0 parts by mass Sulfur: 1.7 parts by mass Vulcanization accelerator (N-cyclohexyl-2-benzothiazyl sulfinamide): 1.7 parts by mass Vulcanization accelerator (diphenylguanidine): 2.0 parts by mass Total: 227.9 parts by mass The above-described materials were kneaded as follows to obtain a rubber composition.

A sealed mixer (internal volume: 0.3 L) equipped with a temperature controller was used, and as a first stage of kneading, the starting material rubber (any of the samples A to I), the fillers (the silica and the carbon black), the silane coupling agent, the process oil, the zinc oxide and the stearic acid were kneaded under conditions of a filling rate of 65% and a rotator rotational speed of 30 to 50 rpm. Here, the temperature of the sealed mixer was controlled to obtain the rubber composition (compound) at a discharging temperature of 155 to 160° C.

Next, after cooling the compound obtained in the first stage of the kneading to room temperature, as a second stage of the kneading, the antioxidant was added thereto, and the resultant was kneaded again to improve the dispersibility of the silica. Also in this case, the discharging temperature for the compound was adjusted to 155 to 160° C. by the temperature control of the mixer.

After cooling the compound obtained in the second stage of the kneading to room temperature, as a third stage of the kneading, sulfur and the vulcanization accelerator were added to and mixed with the resultant compound by an open roll set to 70° C. Thereafter, the resultant was molded and vulcanized at 160° C. for 20 minutes by a vulcanizing press. The physical properties of the rubber composition were evaluated after the vulcanization. Measurement results of the physical properties are shown in Table 2.

The physical properties of each rubber composition was measured as follows:

(1) Mooney Viscosity (130° C.) of Rubber Composition

The viscosity was measured using Mooney viscometer in accordance with JIS K6300-1 after preheating the composition at 130° C. for 1 minute, and after rotating a rotor for 4 minutes at 2 rpm. A smaller value indicates better processability.

(2) Viscoelasticity Parameter (0° C. tan δ and 50° C. tan δ)

A viscoelasticity testing machine "ARES" manufactured by Rheometric Scientific, Inc. was used to measure a viscoelasticity parameter in a torsion mode. Each measurement value was shown as an index obtained assuming that a value obtained in the rubber composition of Comparative Example 5 was 100. A tan δ measured at 0° C. at a frequency of 10 Hz and strain of 1% was used as an index of the wet skid resistance. A larger value indicates better wet skid resistance.

Besides, a tan δ measured at 50° C. at a frequency of 10 Hz and strain of 3% was used as an index of fuel efficiency. A smaller value indicates higher fuel efficiency and better low hysteresis loss property.

(3) Abrasion Resistance

An Acron abrasion tester (manufactured by Yasuda Seiki Seisakusho, Ltd.) was used to measure an abrasion amount through 1000 rotations at a load of 44.4 N in accordance with JIS K6264-2, and results are shown as indexes obtained assuming that the result of Comparative Example 5 was 100. A larger index indicates better abrasion resistance.

TABLE 2

| | | | Example 6 | Example 7 | Example 8 | Example 9 | Example 10 | Comparative Example 5 | Comparative Example 6 | Comparative Example 7 | Comparative Example 8 |
|---|---|---|---|---|---|---|---|---|---|---|---|
| Modified Conjugated Diene-based Polymer (Sample No.) | | | A | B | C | D | E | F | G | H | I |
| Mooney Viscosity ML$_{1+4}$ (100° C.) of Modified Conjugated Diene-based Polymer | | | 63 | 60 | 62 | 65 | 62 | 63 | 64 | 49 | 58 |
| Physical Properties of Rubber Composition after Vulcanization | Mooney Viscosity (130° C.) | Index | 53 | 52 | 48 | 48 | 55 | 65 | 59 | 55 | 60 |
| | Abrasion Resistance | Index | 116 | 115 | 120 | 118 | 110 | 100 | 102 | 105 | 104 |
| | 0° C tan δ (strain 1%) | Index | 117 | 117 | 125 | 122 | 115 | 100 | 105 | 108 | 110 |
| | 50° C. tan δ (strain 3%) | Index | 80 | 81 | 78 | 80 | 83 | 100 | 90 | 87 | 85 |

As shown in Table 2, it was confirmed that the rubber compositions (the modified conjugated diene-based polymer compositions) of Examples 6 to 10 had equivalent or lower Mooney viscosities of the compounds obtained for obtaining vulcanizates, had better processability, were better in the balance between the wet skid resistance and the low hysteresis loss property and better in the abrasion resistance obtained when in the form of a vulcanizate as compared with the rubber compositions of Comparative Examples 5 and 6 although Mooney viscosities before obtaining the compounds were equivalent. It was confirmed, based on these results, that the modified conjugated diene-based polymer compositions of Examples 6 to 10 were excellent in the fuel efficiency, the processability and the balance in the abrasion resistance.

Besides, the modified conjugated diene-based copolymer A used in Example 6 had a single peak of the coupling polymer peak (1) as illustrated in FIG. 2, and hence mostly consisted of six branched polymers, and a ratio of the coupling polymer peak (1) was large as compared with that of the non-coupling polymer peak (2), and therefore, it satisfied all of the relational expression between ML and Mw specified in the present invention, the requirement of the coupling ratio and the requirement of the modification ratio.

On the contrary, the modified conjugated diene-based copolymer H used in Comparative Example 7 contained six branched polymers in a ratio sufficient for satisfying the relational expression between ML and Mw specified in the present invention as illustrated in FIG. 3, but the ratio of the coupling polymer peak (1) was small as compared with that of the non-coupling polymer peak (2), and therefore, the requirements of the coupling ratio and the modification ratio were not satisfied.

The modified conjugated diene-based copolymer I used in Comparative Example 8 satisfied the requirement of the coupling ratio specified in the present invention as illustrated in FIG. 4, and the ratio of the coupling polymer peak (1) was large as compared with that of the non-coupling polymer peak (2) sufficiently for satisfying the requirement of the modification ratio, but since the coupling polymer peak (1) was not a single peak, and a ratio of five or less branched polymers was large, the relational expression between ML and Mw was not satisfied.

In addition, as shown in Table 2, it was confirmed that the rubber composition (the modified conjugated diene-based polymer composition) of Example 6 had lower Mooney viscosity of the compound obtained for obtaining a vulcanizate, had better processability, was better in the balance between the wet skid resistance and the low hysteresis loss property and better in the abrasion resistance when in the form of a vulcanizate as compared with the rubber compositions of Comparative Examples 7 and 8 although Mooney viscosity before obtaining the compound was high.

It was confirmed, based on these results, that a remarkable effect could not be attained unless the requirements of the present invention were satisfied even if the same coupling agent was used.

This application is based upon the prior Japanese patent application (Japanese Patent Application No. 2015-119504), filed with Japan Patent Office on Jun. 12, 2015, the entire contents of which are incorporated herein by reference.

INDUSTRIAL APPLICABILITY

A modified conjugated diene-based polymer according to the present invention is excellent in the fuel efficiency and the abrasion resistance when in the form of a vulcanized rubber, and is also excellent in the processability when used for obtaining a composition through mixing with another component or obtaining a vulcanized rubber, and hence can be suitably used as a material of various members such as tire treads, shoes and industrial products.

REFERENCE SIGNS LIST

1 coupling polymer peak
2 non-coupling polymer peak

The invention claimed is:
1. A modified conjugated diene-based polymer,
wherein a ratio of a coupling polymer, obtained by gel permeation chromatography (GPC), is 70% by mass or more based on a total amount of the modified conjugated diene-based polymer, and a modification ratio obtained by adsorption GPC is 70% by mass or more based on a total amount of the modified conjugated diene-based polymer,
wherein, when Mooney viscosity $ML_{1+4}$ (100° C.) measured at 100° C. is represented by ML and a weight average molecular weight obtained by GPC is represented by Mw, $ML \leq 1.8 (Mw \times 10^{-4}) - 31.5$,
wherein Mooney viscosity $ML_{1+4}$ (100° C.) measured at 100° C. is 30 to 150, and
wherein when a peak top molecular weight, obtained by GPC, of a coupling polymer of the modified conjugated diene-based polymer is represented by $Mp_1$ and a peak top molecular weight of a non-coupling polymer of a conjugated diene-based polymer chain constituting the modified conjugated diene-based polymer is represented by $Mp_2$, $(Mp_1/Mp_2) \geq 3.4$.

2. The modified conjugated diene-based polymer according to claim 1, wherein the modified conjugated polymer has a nitrogen atom and/or a silicon atom.

3. The modified conjugated diene-based polymer according to claim 1, wherein the modified conjugated polymer has a silicon atom, and at least one of the silicon atom constitutes an alkoxysilyl group having 1 to 20 carbon atoms or a silanol group.

4. The modified conjugated diene-based polymer according to claim 1, wherein the modified conjugated diene-based polymer has a branch structure including six or more branches.

5. The modified conjugated diene-based polymer according to claim 1, wherein $ML \leq 1.8(Mw \times 10^{-4}) - 44.2$.

6. The modified conjugated diene-based polymer according to claim 1, wherein $(Mp_1/Mp_2) \geq 3.8$.

7. The modified conjugated diene-based polymer according to claim 1, wherein the modified conjugated diene-based polymer is represented by following general formula (I):

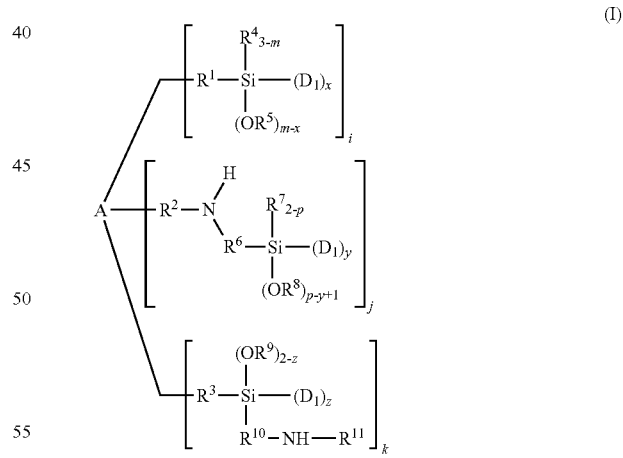

wherein $D_1$ represents a conjugated diene-based polymer chain, $R^1$ to $R^3$ each independently represent a single bond or an alkylene group having 1 to 20 carbon atoms, $R^4$ and $R^7$ each independently represent an alkyl group having 1 to 20 carbon atoms, $R^5$, $R^8$ and $R^9$ each independently represent a hydrogen atom or an alkyl group having 1 to 20 carbon atoms, $R^6$ and $R^{19}$ each independently represent an alkylene group having 1 to 20 carbon atoms, $R^{11}$ represents a hydrogen atom or an alkyl group having 1 to 20 carbon atoms, m and x each represent an integer of 1 to 3, x≤m, p represents 1 or 2, y represents an integer of 1 to 3, y≤(p+1), z represents an integer of 1 or 2, each of $D_1$, $R^1$ to $R^{11}$, m, p, x, y and z, if present in a plural number, is respectively independent and may be the same as or different from each other, i represents an integer of 0 to 6, j represents an integer of 0 to 6, k represents an integer of 0 to 6, (i+j+k) is an integer of 3 to 10, ((x×i)+(y×j)+(z×k)) is an integer of 6 to 30, and A represents a hydrocarbon group having 1 to 20 carbon atoms, or an organic group having at least one atom selected from the group consisting of an oxygen atom, a nitrogen atom, a silicon atom, a sulfur atom and a phosphorous atom, and not having active hydrogen.

8. The modified conjugated diene-based polymer according to claim 7, wherein A in the formula (I) represents any one of following formulas (II) to (V):

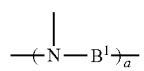

(II)

wherein $B^1$ represents a single bond or a hydrocarbon group having 1 to 20 carbon atoms, a represents an integer of 1 to 10, and $B^1$, if present in a plural number, is respectively independent, and may be the same as or different from each other;

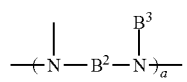

(III)

wherein $B^2$ represents a single bond or a hydrocarbon group having 1 to 20 carbon atoms, $B^3$ represents an alkyl group having 1 to 20 carbon atoms, a represents an integer of 1 to 10, and each of $B^2$ and $B^3$, if present in a plural number, is respectively independent, and may be the same as or different from each other;

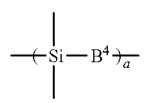

(IV)

wherein $B^4$ represents a single bond or a hydrocarbon group having 1 to 20 carbon atoms, a represents an integer of 1 to 10, and $B^4$, if present in a plural number, is respectively independent, and may be the same as or different from each other; and

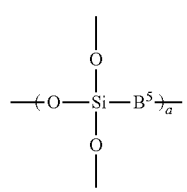

(V)

wherein $B^5$ represents a single bond or a hydrocarbon group having 1 to 20 carbon atoms, a represents an integer of 1 to 10, and $B^5$, if present in a plural number, is respectively independent, and may be the same as or different from each other.

9. A method for producing the modified conjugated diene-based polymer according to claim 1, comprising steps of:

polymerizing at least a conjugated diene compound using an organomonolithium compound as a polymerization initiator to give a conjugated diene-based polymer; and reacting the conjugated diene-based polymer with a coupling agent having hexa- or more functional groups, with a mole number of the functional groups of the coupling agent being 0.8 mol or more and 1.2 mol or less based on a mole of an organomonolithium compound used in the polymerization step.

10. The method for producing the modified conjugated diene-based polymer according to claim 9, wherein a compound represented by following formula (VI) is used as the coupling agent:

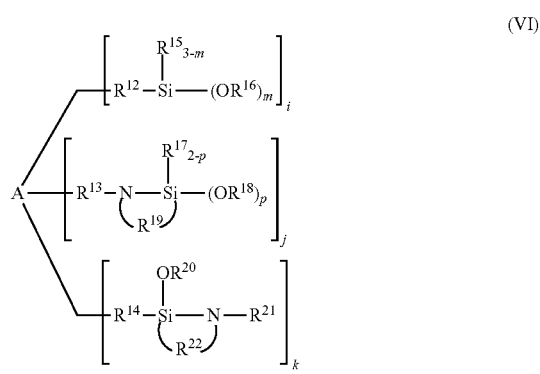

(VI)

wherein $R^{12}$ to $R^{14}$ each independently represent a single bond or an alkylene group having 1 to 20 carbon atoms, $R^{15}$ to $R^{18}$ and $R^{20}$ each independently represent an alkyl group having 1 to 20 carbon atoms, $R^{19}$ and $R^{22}$ each independently represent an alkylene group having 1 to 20 carbon atoms, $R^{21}$ represents an alkyl group or a trialkylsilyl group having 1 to 20 carbon atoms, m represents an integer of 1 to 3, p represents 1 or 2, each of $R^{12}$ to $R^{22}$, m and p, if present in a plural number, is respectively independent, and may be the same as or different from each other, i represents an integer of 0 to 6, j represents an integer of 0 to 6, k represents an integer of 0 to 6, (i+j+k) is an integer of 3 to 10, ((m−1)×i+p×j+k) represents an integer of 6 to 30, and A represents hydrocarbon group having 1 to 20 carbon atoms, or an organic group having at least one atom selected from the group consisting of an oxygen atom, a nitrogen atom, a silicon atom, a sulfur atom and a phosphorous atom, and not having active hydrogen.

11. The method for producing the modified conjugated diene-based polymer according to claim 10, wherein A in the formula (VI) represents any one of following formulas (II) to (V):

(II)

wherein $B^1$ represents a single bond or a hydrocarbon group having 1 to 20 carbon atoms, a represents an integer of 1 to 10, and $B^1$, if present in a plural number, is respectively independent, and may be the same as or different from each other;

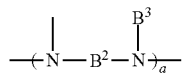  (III)

wherein $B^2$ represents a single bond or a hydrocarbon group having 1 to 20 carbon atoms, $B^3$ represents an alkyl group having 1 to 20 carbon atoms, a represents an integer of 1 to 10, and each of $B^2$ and $B^3$, if present in a plural number, is respectively independent, and may be the same as or different from each other;

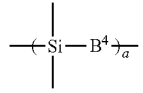  (IV)

wherein $B^4$ represents a single bond or a hydrocarbon group having 1 to 20 carbon atoms, a represents an integer of 1 to 10, and $B^4$, if present in a plural number, is respectively independent, and may be the same as or different from each other; and

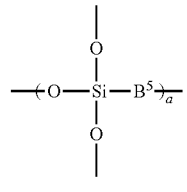  (V)

wherein $B^5$ represents a single bond or a hydrocarbon group having 1 to 20 carbon atoms, a represents an integer of 1 to 10, and $B^5$, if present in a plural number, is respectively independent, and may be the same as or different from each other.

12. The method for producing the modified conjugated diene-based polymer according to claim 11, wherein A in the formula (VI) represents the formula (II) or the formula (III), and k represents 0 (zero).

13. A rubber composition, comprising:
a rubber component comprising the modified conjugated diene-based polymer according to claim 1 in an amount of 10% by mass or more; and
a silica-based filler in an amount of 5.0 parts by mass or more and 150 parts by mass or less based on 100 parts by mass of the rubber component.

14. A tire comprising the rubber composition according to claim 13.

* * * * *